(12) United States Patent
Yoon

(10) Patent No.: US 12,093,057 B2
(45) Date of Patent: Sep. 17, 2024

(54) DISTRIBUTED ROBOT-BASED OBJECT MOVEMENT SYSTEM AND OBJECT MOVEMENT METHOD USING THE SAME

(71) Applicant: Jihyun Yoon, Seoul (KR)

(72) Inventor: Jihyun Yoon, Seoul (KR)

( * ) Notice: Subject to any disclaimer, the term of this patent is extended or adjusted under 35 U.S.C. 154(b) by 234 days.

(21) Appl. No.: 17/873,445

(22) Filed: Jul. 26, 2022

(65) Prior Publication Data

US 2023/0376046 A1 Nov. 23, 2023

(30) Foreign Application Priority Data

May 18, 2022 (KR) ........................ 10-2022-0060853

(51) Int. Cl.
*G05D 1/00* (2024.01)
*E04H 6/36* (2006.01)
*E04H 6/42* (2006.01)

(52) U.S. Cl.
CPC ............. *G05D 1/0287* (2013.01); *E04H 6/36* (2013.01); *E04H 6/424* (2013.01); *G05D 1/0214* (2013.01)

(58) Field of Classification Search
CPC .... G05D 1/0287; G05D 1/0214; G05D 1/667; G05D 1/6987; G05D 2015/28; G05D 2107/95; G05D 2109/10; E04H 6/36; E04H 6/424
See application file for complete search history.

(56) References Cited

U.S. PATENT DOCUMENTS

| | | | | |
|---|---|---|---|---|
| 2020/0180572 A1* | 6/2020 | Tzivanopoulos | ....... | E04H 6/305 |
| 2020/0183421 A1* | 6/2020 | Schütz | .................... | B60L 50/50 |
| 2020/0269425 A1* | 8/2020 | Shikano | ...................... | B25J 3/04 |
| 2020/0269426 A1* | 8/2020 | Shikano | .................... | E04H 6/12 |
| 2021/0347290 A1* | 11/2021 | Fu | ............................ | E04H 6/305 |
| 2022/0129010 A1* | 4/2022 | Prosser | ................ | B62D 63/025 |
| 2022/0282512 A1* | 9/2022 | Shikano | .................... | E04H 6/24 |
| 2022/0307281 A1* | 9/2022 | Globerman | ............. | B60S 9/215 |

FOREIGN PATENT DOCUMENTS

| | | | | |
|---|---|---|---|---|
| CN | 109403690 A | * | 3/2019 | ............... E04H 6/18 |
| CN | 112256018 A | * | 1/2021 | ........... G05D 1/0212 |
| DE | 102017220580 A1 | * | 5/2019 | ................ B25J 5/00 |

(Continued)

OTHER PUBLICATIONS

Amanatiadis et al.; AVERT: An Autonomous Multi-Robot System for Vehicle Extraction and Transportation; 2015 IEEE International Conference on Robotics and Automation (ICRA) Washington State Convention Center Seattle, Washington, May 26-30, 2015; pp. 1662-1669 (Year: 2015).*

*Primary Examiner* — Michael J Zanelli

(74) *Attorney, Agent, or Firm* — CANTOR COLBURN LLP

(57) ABSTRACT

Provided are a distributed robot-based object movement system and an object movement method using the same. The distributed robot-based object movement system includes a first robot that moves to a reference location where a target object is located, and acquires path information for moving the target object from the reference location to a predetermined destination location, and a second robot that moves to the reference location, provides a driving force for lifting the target object, and drives according to the path information while lifting the target object.

16 Claims, 18 Drawing Sheets

(56) References Cited

FOREIGN PATENT DOCUMENTS

| | | | | |
|---|---|---|---|---|
| EP | 3663487 B1 * | 7/2021 | ............. | B60S 13/00 |
| ES | 2896063 T3 * | 2/2022 | ............. | B60G 17/00 |
| JP | 2021071022 A * | 5/2021 | ............. | B60S 13/02 |
| KR | 101703651 | 2/2017 | | |
| KR | 20170125926 | 11/2017 | | |
| KR | 20210006138 | 1/2021 | | |
| KR | 102282758 | 7/2021 | | |
| WO | WO-2023274689 A1 * | 1/2023 | ............. | B25J 11/00 |

\* cited by examiner

DISTRIBUTED ROBOT-BASED OBJECT MOVEMENT SYSTEM AND OBJECT MOVEMENT METHOD USING THE SAME

BACKGROUND

Field

The present disclosure relates to a distributed robot-based object movement system and an object movement method using the same.

Description of the Related Art

A conventional parking system has been generally operated in the same manner as a driver directly drives a vehicle, searches for a parking location in a parking lot, and goes to the parked location, drives the vehicle, and then exits the parking lot during exiting. In this case, it is not only very difficult to find an empty space for parking when parking, but also it is difficult to find a parked location to get out of the parked vehicle as the area of the parking space increases.

On the other hand, even in the case of a parking lot equipped with a mechanical parking system, since a vehicle can be moved only on a path set for parking or exiting, it is inconvenient that it is impossible to park or exit several vehicles at once when entering and exiting.

Accordingly, a parking robot, a robot that automatically performs vehicle entering and exiting without a person, has been introduced, and the parking robot has advantages of having significantly higher space utilization than when a person parks directly because the parking robot lifts and tows all or part of the vehicle and tightly parking the vehicles because there is no need for spare space for people to get on and off In this regard, a logistics transport robot AGV (automated guided vehicle or automatic guided vehicle), which has been mainly used for factory logistics, warehouse logistics, etc., has recently started to be used in full-scale for last mile delivery and an intelligent parking system according to the grafting of innovative new technologies such as the Internet-of-Things (IoT), processing power, and sensors and changes in market conditions. In particular, as serious problems have been caused due to global urbanization, the popularization of automobiles, and the lack of availability of parking facilities, a parking robot system using AGV is recognized as an efficient alternative to these problems, and as a result, some corporate products are entering the market in earnest after completing development and empirical tests.

However, most of the parking robots currently being developed are very large in size and occupy some area in the parking space, making it difficult to be managed. In addition, delivery robots for transporting goods other than the vehicle also have a fixed size and have a limit on the weight that may be mounted, and as a result, there is a limit to delivering bulky or heavy goods.

The background art of the present disclosure is disclosed in Korean Patent Registration No. 10-2282758.

SUMMARY

An object to be achieved by the present disclosure is to provide a distributed robot-based object movement system and an object movement method using the same which operates as one group to move a target object, performs operations such as path generation, obstacle search, collision detection, and the like within a target space, and provides a driving force to move the target object to be moved in a lifted state.

However, a technical object to be achieved by an exemplary embodiment of the present invention is not limited to the technical objects and there may be other technical objects.

According to an aspect of the present disclosure, there is provided a distributed robot-based object movement system. The distributed robot-based object movement system may include a first robot that moves to a reference location where a target object is located, and acquires path information for moving the target object from the reference location to a predetermined destination location, and a second robot that moves to the reference location, provides a driving force for lifting the target object, and drives according to the path information in while lifting the target object.

Further, the first robot may generate the path information or receive the path information from an integrated control server.

Further, the first robot may generate the path information based on first reference information associated with the target object and second reference information for a target space including the reference location and the destination location.

Further, the first reference information may include shape information and size information of the target object.

Further, the second reference information may include obstacle information located in the target space.

Further, the first robot may detect a risk of collision of the target object based on the first reference information and the second reference information, and generate the path information in consideration of the detected risk of collision.

Further, the first robot may drive around the target object together with the second robot according to the path information, determine a relative driving location corresponding to the location of the target object according to a progress direction of the target object, and acquire the second reference information in consideration of the determined driving location.

Further, the second robot may be disposed to lift a preset lift area with respect to the target object.

Further, the second robot may detect the location of the lift area when moving to the reference location, and detect the lifting level of the lift area when the driving force is provided.

Further, a plurality of second robots may be provided.

Further, each of the plurality of second robots may be allocated to a different lift area with respect to the target object.

Further, the plurality of second robots may move in a coupled state to each other to reach the reference location, and then separately move so that each of the plurality of second robots is located in the lift area allocated to each of the plurality of second robots.

Further, the first robot and the second robot may drive while exchanging location information and sensing information for a driving environment with each other.

Further, the distributed robot-based object movement system may further include an integrated control server that receives a target object transport request of the user, transmits a movement control command to the reference location to at least one of the first robot and the second robot in response to the target object transport request, and receives location information and state information of each of the first robot and the second robot from at least one of the first robot and the second robot.

Further, the integrated control server may select the first robot and the second robot to move to the reference location in response to the target object transport request from among the plurality of robots.

Further, the integrated control server may select the first robot and the second robot based on charging state information of each of the plurality of robots.

Further, the integrated control server may provide, to the user terminal of the user, the location information, the state information, and estimated arrival time information to the reference location or the destination location of at least one of the first robot and the second robot.

Further, the integrated control server may receive the target object transport request including user information of the user and object identification information of the target object, and generate authentication information for recovery of the target object based on the user information and the object identification information.

Meanwhile, according to another aspect of the present disclosure, there is provided an object movement method using a distributed robot-based object movement system. The object movement method may include steps of (a) acquiring information on a reference location associated with a target object, (b) moving a first robot that acquires path information for moving the target object from the reference location to a predetermined destination location and a second robot that provides a driving force for lifting the target object to the reference location, (c) lifting the target object by the second robot, and (d) transporting the target object to the destination location while the first robot and the second robot drive according to the path information while the second robot lifts the target object.

Further, according to yet another aspect of the present disclosure, there is provided an object movement method using a distributed robot-based object movement system. The object movement method may include steps of (a) transmitting, by an integrated control server, a movement control command including information on a reference location associated with a target object to at least one of a first robot and a second robot, (b) moving the first robot that acquires path information for moving the target object from the reference location to a predetermined destination location and the second robot that provides a driving force for lifting the target object to the reference location, (c) lifting the target object by the second robot, (d) transporting the target object to the destination location while the first robot and the second robot drive according to the path information while the second robot lifts the target object, and (e) acquiring, by the integrated control server, location information and state information of each of the first robot and the second robot.

Meanwhile, according to yet another aspect of the present disclosure, there is provided a control robot of a distributed robot-based object movement system. The control robot may include a driving module for moving a target space including a reference location where a target object is located and a predetermined destination location for moving the target object, a sensor module for acquiring first reference information associated with the target object and second reference information for the target space including the reference location and the destination location in the target space, and a communication module for acquiring path information from the reference location to the destination location and transmitting a driving control command based on the path information to a lift robot for lifting the target object.

Further, according to yet another aspect of the present disclosure, there is provided a control robot of a distributed robot-based object movement system, the control robot may include a computation module for generating the path information based on the first reference information and the second reference information.

Meanwhile, according to yet another aspect of the present disclosure, there is provided a lift robot of a distributed robot-based object movement system. The lift robot may include a driving module for moving a target space including a reference location where a target object is located and a predetermined destination location for moving the target object, a communication module for receiving path information from the reference location to the destination location and receiving a driving control command based on the path information from a control robot, and a lifting module for providing a driving force for lifting the target object in the reference location.

Further, the driving module may drive according to path information while the lifting module lifts the target object.

Further, the lifting module may include a pair of driving units which include a first body part formed with a female screw and a second body part formed with a male screw coupled to the female screw, respectively, and a motor part for providing a driving force so that the first body part and the second body part are relatively close to or far away from each other, a roller unit interposed between the pair of driving units so as to support the lower portion of the target object and lift the target object while the male screw and the female screw are fastened to each other by moving the first body part and the second body part of each of the pair of driving units in a direction close to each other, and a support unit for supporting at least a part of an outer surface of the target object while the target object moves upward to prevent separation of the target object.

Further, the lifting module may lift a preset lift area with respect to the target object.

Further, according to yet another aspect of the present disclosure, there is provided a lift robot of a distributed robot-based object movement system, the lift robot may further include a sensor module for detecting a location of the lift area when moving to the reference location and detecting a lifting level of the lift area when the driving force is provided.

The above-mentioned aspects are merely exemplary and should not be construed as limiting the present invention. In addition to the above-described exemplary embodiments, additional exemplary embodiments may exist in the drawings and detailed description of the invention.

According to the present disclosure, it is possible to provide a distributed robot-based object movement system and an object movement method using the same which operates as one group to move a target object, performs operations such as path generation, obstacle search, collision detection, and the like within a target space, and provides a driving force to move the target object to be moved in a lifted state.

Further, according to the present disclosure, when the target object is a vehicle, energy consumption may be reduced by minimizing the time moved to search for a space where the vehicle may be parked in a parking lot.

Further, according to the present disclosure, since there is no spare space for drivers, etc. to get on and off by moving the vehicle to a predetermined space using the distributed robot, it is possible to park the vehicle tightly by maximizing a limited parking space.

Further, according to the present disclosure, when a bulky target object is to be transported, after a flatbed member, etc. are disposed on the second robot, the object may be loaded on the flatbed member, etc., so that it is possible to transport the object regardless of the weight or size of the target object.

However, the effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 10A to 10D are schematic diagrams illustrating a relative driving location of a first robot determined in consideration of a heading direction of the target object, a location of an adjacent object, and the like;

DETAILED DESCRIPTION OF THE EMBODIMENT

Figure 1:
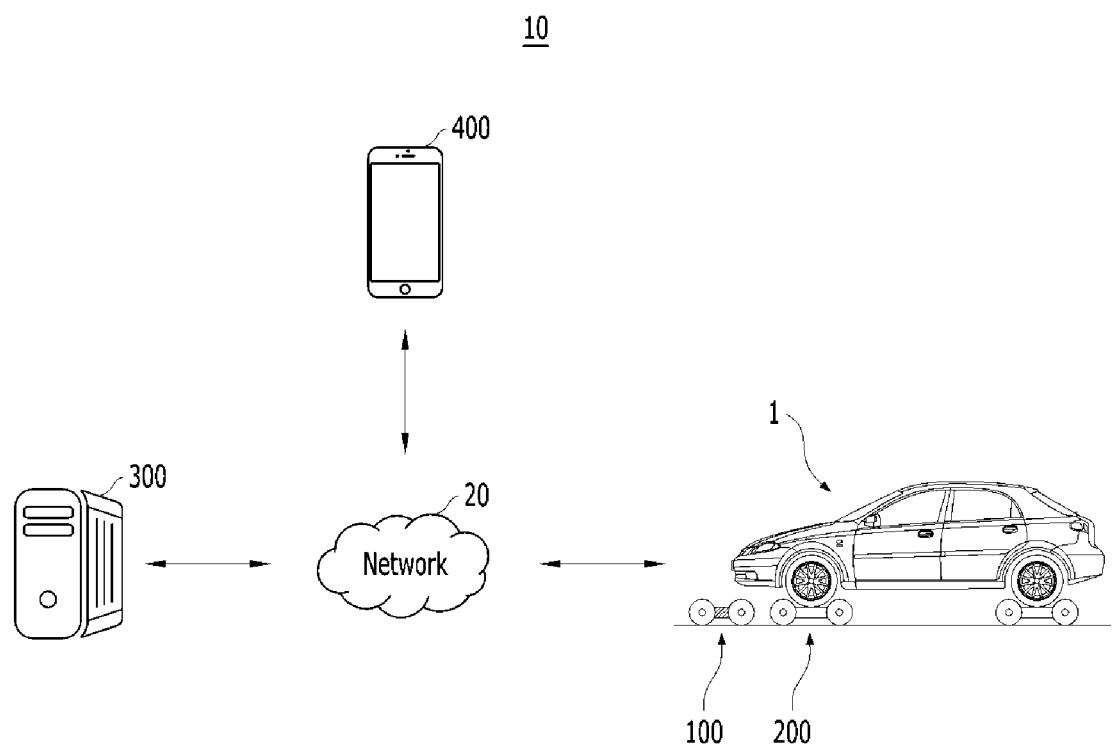
FIG. 1 is a schematic configuration diagram of a distributed robot-based object movement system according to an exemplary embodiment of the present disclosure.

Hereinafter, exemplary embodiments of the present invention will be described in detail so as to be easily implemented by those skilled in the art, with reference to the accompanying drawings. However, the present invention may be embodied in many different forms and are not limited to the exemplary embodiments to be described herein. In addition, parts not related with the description have been omitted in order to clearly describe the present invention in the drawings and throughout this specification, like reference numerals designate like elements.

Further, throughout this specification, when a certain part is "connected" with the other part, it is meant that the certain part may be "directly connected" with the other part and "electrically connected" or "indirectly connected" with the other part with another element interposed therebetween.

Throughout this specification, it will be understood that when a member is referred to as being "on", "in upper portion", "in upper end", "below", "in lower portion", and "in lower end" the other member, it may be directly on the other member or intervening members may also be present.

Throughout this specification, unless explicitly described to the contrary, a case where any part "includes" any component will be understood to imply the inclusion of stated components but not the exclusion of any other component.

For reference, the terms (front, rear, rear end, upper, upward, downward, etc.) related to the directions or locations in the description of the exemplary embodiment of the present disclosure will be described based on an arrangement state of each component illustrated in the drawings. For example, when viewed in FIGS. 2B, 3A, and 3B, a front-rear direction may be a direction from 3 o'clock to 9 o'clock, and an up-down direction may be a direction from 12 o'clock to 6 o'clock. In addition, when viewed from FIGS. 5A to 6B, the front-rear direction may be a direction from 3 o'clock to 9 o'clock, the up-down direction may be a normal direction of the drawing, and a width direction may be a direction from 12 o'clock to 6 o'clock.

However, this direction setting may vary depending on a dislocation state of the distributed robot disclosed herein. For example, if necessary, the distributed robot of the present disclosure may be disposed so that an upward direction of FIG. 2B is directed in a horizontal direction (left-right direction), and as another example, the distributed robot of the present disclosure may be disposed so that the upward direction of FIG. 2B is directed in an oblique direction.

The present disclosure relates to a distributed robot-based object movement system and an object movement method using the same.

FIG. 1 is a schematic configuration diagram of a distributed robot-based object movement system according to an exemplary embodiment of the present disclosure.

Referring to FIG. 1, a distributed robot-based object movement system 10 (hereinafter, referred to as an "object movement system 10") according to an exemplary embodiment of the present disclosure may include a first robot 100, a second robot 200, an integrated control server 300, and a user terminal 400.

The first robot 100, the second robot 200, the integrated control server 300, and the user terminal 400 may communicate with each other via a network 20. The network 20 means a connection structure in which information is exchangeable between respective nodes such as terminals and servers. Examples of the network 20 include a 3rd generation partnership project (3GPP) network, a long term evolution (LTE) network, a 5G network, a world interoperability for microwave access (WIMAX) network, Internet, a local area network (LAN), a wireless local area network (Wireless LAN), a wide area network (WAN), a personal area network (PAN), a WiFi network, a Bluetooth network, a satellite broadcasting network, an analog broadcasting network, a digital multimedia broadcasting (DMB) network, and the like, but are not limited thereto.

The user terminal 400 may include, for example, a smartphone, a SmartPad, a tablet PC, etc., and all types of wireless communication devices, such as PCS (Personal Communication System), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), and Wibro (Wireless Broadband Internet) terminal.

In the description of the embodiment of the present disclosure, the user terminal 400 may be a terminal which receives a target object transport request for moving the target object from the user and transmits the received request to the integrated control server 300, etc., and receives and outputs information on a movement state, an arrival state, a storage state, etc. of the target object moving from a reference location to a target location by a plurality of distributed robots including the first robot 100 and the second robot 200 disclosed herein. For example, when the target object is a vehicle, the user terminal 400 may be a terminal possessed by a driver or a passenger of the corresponding vehicle, but is not limited thereto.

Meanwhile, in the description of the exemplary embodiment of the present disclosure, the first robot 100 may refer to a control robot 100 that moves to a reference location where the target object is located among a plurality of distributed robots of the object movement system 10, and acquires path information for moving the target object from the reference location to a predetermined destination location. In other words, in the description of the exemplary embodiment of the present disclosure, reference numeral 100 may be used interchangeably with respect to the first robot 100 and the control robot 100.

In addition, in the description of the exemplary embodiment of the present disclosure, the second robot 200 may refer to a lift robot 200 that moves to a reference location among the plurality of distributed robots of the object movement system 10 to provide a driving force for lifting the target object, and drives along the path information acquired by the first robot 100 while lifting the target object. In other words, in the description of the exemplary embodiment of the present disclosure, reference numeral 200 may be used interchangeably with respect to the second robot 200 and the lift robot 200.

According to an exemplary embodiment of the present disclosure, in the object movement system 10, a plurality (e.g., five or more) of distributed robots operate together to form a group, in which the plurality of distributed robots may consist of two types of robots that operate in different methods. Meanwhile, in this regard, the number of distributed robots included in the object movement system 10 may vary according to the standard and the like of the target object.

The object movement system 10 disclosed herein may move the target object from the reference location to the destination location while the second robot 200 drives along the path information while lifting the target object. Meanwhile, in the description of the exemplary embodiment of the present disclosure, the 'target object' may refer to an object that a user wants to move from the reference location to the destination location, such as a vehicle, cargo, and the like. The 'reference location' refers to a location where the first robot 100 determines information about the target object and the second robot 200 lifts the target object. The 'destination location' may refer to a location designated as a destination to which the second robot 200 intends to move the target object while lifting the target object.

Meanwhile, when the target object is a vehicle, the reference location and the destination location may be relatively determined according to a type of movement service requested by the user. For example, when the user requests a distributed robot autonomous driving-based parking service, the reference location is determined by a location where the user gets off the corresponding vehicle, and the destination location may be determined as a location of an empty parking area in the parking lot where the corresponding vehicle is to be parked. As another example, when the user requests a distributed robot autonomous driving-based exiting service, the reference location is determined as a location and the like where the corresponding vehicle has been previously parked, and the destination location may be determined as a location and the like where the user intends to get on the corresponding vehicle again after completing the exiting of the corresponding vehicle.

The integrated control server 300 may receive a target object transport request of the user. For example, the integrated control server 300 may receive a target object transport request from the user terminal 400 through a dedicated application App installed in the user terminal 400.

In addition, the integrated control server 300 may transmit a movement control command to the reference location to at least one of the first robot 100 and the second robot 200 in response to the received target object transport request.

In addition, the integrated control server 300 may receive the location information and the state information of each of the first robot 100 and the second robot 200 from at least one of the first robot 100 and the second robot 200.

Figure 8A:
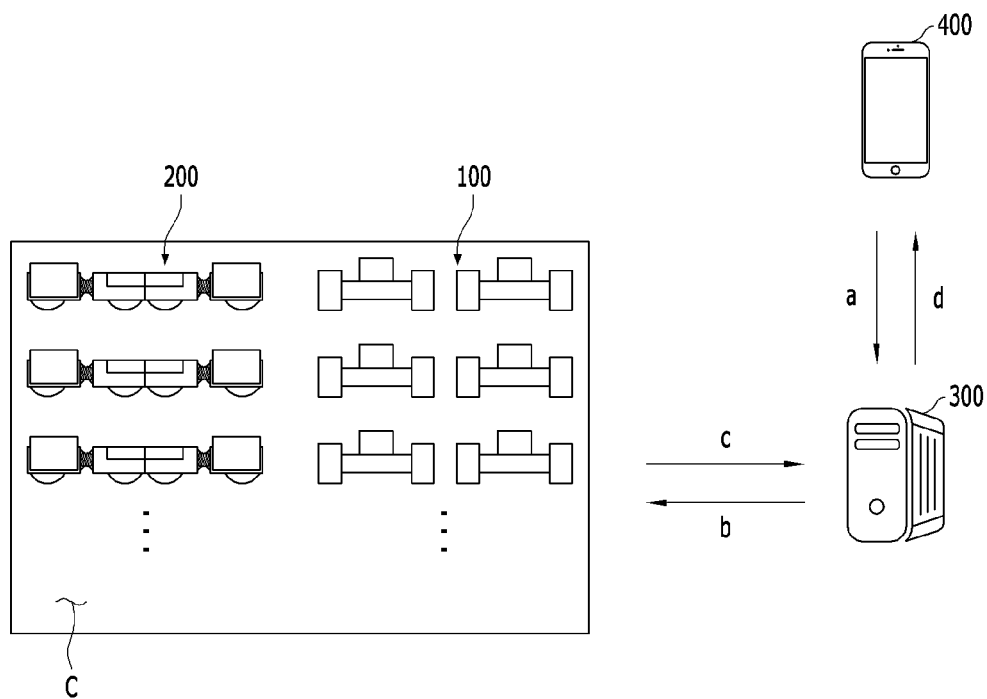
FIGS. 8A and 8B are schematic diagrams for describing a communication process of a plurality of distributed robots with respect to an integrated control server or a user terminal.

Specifically, the integrated control server 300 may select the first robot 100 and the second robot 200 to move to the reference location in response to the target object transport request among a plurality of robots (e.g., a charging station (see 'C' in FIG. 8A). In this regard, according to an exemplary embodiment of the present disclosure, the integrated control server 300 may select the first robot 100 and the second robot 200 to move to the reference location based on charging state information of each of the plurality of robots.

However, it is not limited thereto, and according to the embodiment of the present disclosure, the integrated control server 300 may select the first robot 100 and the second robot 200 to move to the reference location in response to a predetermined target object transport request by considering a separation distance from an initial location of each of the plurality of robots to a reference location, an existing allocation history of each of the plurality of robots, and the like.

In addition, the integrated control server 300 may provide the location information and the state information of each of the first robot 100 and the second robot 200 and estimated arrival time information to the reference location or the destination location of at least one of the first robot 100 and the second robot 200 to the user terminal 400 of the user.

In addition, the integrated control server 300 may receive a target object transport request including user information (e.g., personal information, account information of a dedicated application of the corresponding user, etc.) of the user and object identification information (e.g., vehicle number information, etc.) of the target object and generate authentication information for retrieval of the target object based on the received user information and object identification information. In this regard, when the user wants to retrieve the target object again (e.g., exiting of the vehicle, etc.) after the target object moves to the predetermined destination location, the integrated control server 300 may perform user authentication based on pre-generated authentication information and then provide the corresponding target object to the user, thereby preventing theft or loss of the target object.

According to an exemplary embodiment of the present disclosure, the first robot 100 may generate path information for moving the target object from the reference location to the destination location or receive path information from the integrated control server 300.

In this regard, the first robot 100 or the integrated control server 300 may generate path information based on first reference information associated with the target object and second reference information on the target space including the reference location and the destination location.

Specifically, the first reference information may include shape information and size information of the target object. In addition, the second reference information may include information about obstacles located in the target space, and the reference information for generating such path information may be acquired by sensor modules 130 and 240 provided in the first robot 100 and the second robot 200.

More specifically, the first robot 100 or the integrated control server 300 may detect a collision risk of the target object based on the first reference information and the second reference information, and generate path information in consideration of the detected collision risk.

For autonomous driving of the plurality of distributed robots, it may be required to recognize all directions using sensors. However, in order to drive while lifting the target object, since the second robot 200 is disposed under the target object (e.g., under the tire of the vehicle, under the flatbed member, etc.), a sensor for recognizing the surrounding environment provided in the second robot 200 may have a partial sensing range covered by the target object, so that it may be difficult to recognize all directions around the target object.

In order to supplement this problem, the object movement system 10 described in the present disclosure may perform independently functions of determination of a destination location (determination of an empty parking space, etc.), generation of path information, detection of obstacles on the path, etc. required so that the first robot 100 may freely move around the target object or in the target space, and the plurality of second robots 200 may move through autonomous driving while lifting the target object.

Specifically, the first robot 100 collects all the reference information received from the second robot 200 to generate a map of the target space for determining the collision and generate a path through which each distributed robot is to drive. In addition, the first robot 100 performs an algorithm for individually controlling the second robot 200 based on the generated path information or the path information received from the integrated control server 300, and generates a control command (e.g., a command for a rotation direction, a speed, an acceleration, etc. of a motor mounted on each second robot 200) to be followed by each second robot 200 to transmit the control command to the second robot 200 side.

In addition, since the second robot 200 lifts the target object under the target object (under the wheel or flatbed of a vehicle), the size of the target object is not known precisely, so that it may be difficult to plan of the path (path planning) based on only the sensing data of the second robot 200 by checking the collision risk (collision check) when lifting the target object or considering the collision risk and the like.

In consideration of this, in the object movement system 10 described in the present disclosure, the first robot 100 may preemptively move the periphery of the target object, scan the outer shape of the target object through the sensor, accurately measure the shape and size of the target object, and store the measured information or transmit the measured information to the integrated control server 300. Accordingly, in the process of transporting the target object from the reference location of the destination location, accurate collision check for obstacles that may be located in the target space may be performed and furthermore, the path planning capable of preventing unexpected accidents may be performed.

More specifically, the first robot 100 records an image of the appearance of the target object photographed when transporting the target object to determine in advance whether the target object has scratches or the like before transporting and prepare for the problem of responsibility due to damage to the target object that may occur in the future. Particularly, when the target object is a vehicle, the first robot 100 recognizes the license plate of the corresponding vehicle around the target object to match and store the vehicle with the user of the user terminal 400 and prevent unauthorized users from transporting the vehicle in the future based thereon.

In addition, according to an exemplary embodiment of the present disclosure, the first robot 100 and the second robot 200 may drive while exchanging respective location information and sensing information for a driving environment.

Specifically, all the distributed robots in a group including the first robot 100 and the plurality of second robots 200 may drive while communicating with each other through communication modules 120 and 220 provided respectively. In addition, the first robot 100 and the plurality of second robots 200 may acquire (measure) reference information about each surrounding driving environment and a relative location of each distributed robot through the sensor modules 130 and 240 provided respectively. In addition, the first robot 100 and the plurality of second robots 200 may perform calculations required for each driving situation through a calculation module 140 provided respectively, and drive while sharing the results.

Hereinafter, a mechanism for lifting the target object by the second robot 200 and a structure for providing a driving force for lifting the target object of the second robot 200 will be described with reference to FIGS. 2A to 3B.

Figure 2A:
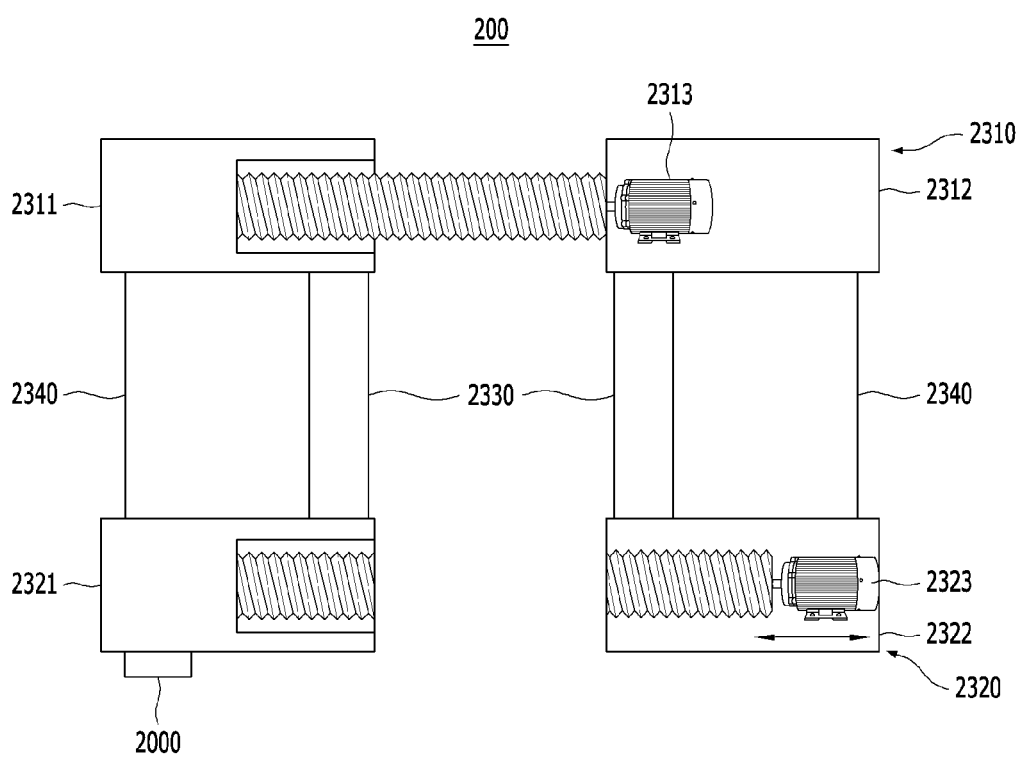
FIGS. 2A and 2B are schematic diagrams illustrating a structure of a second robot for providing a driving force for lifting a target object.
Figure 2B:
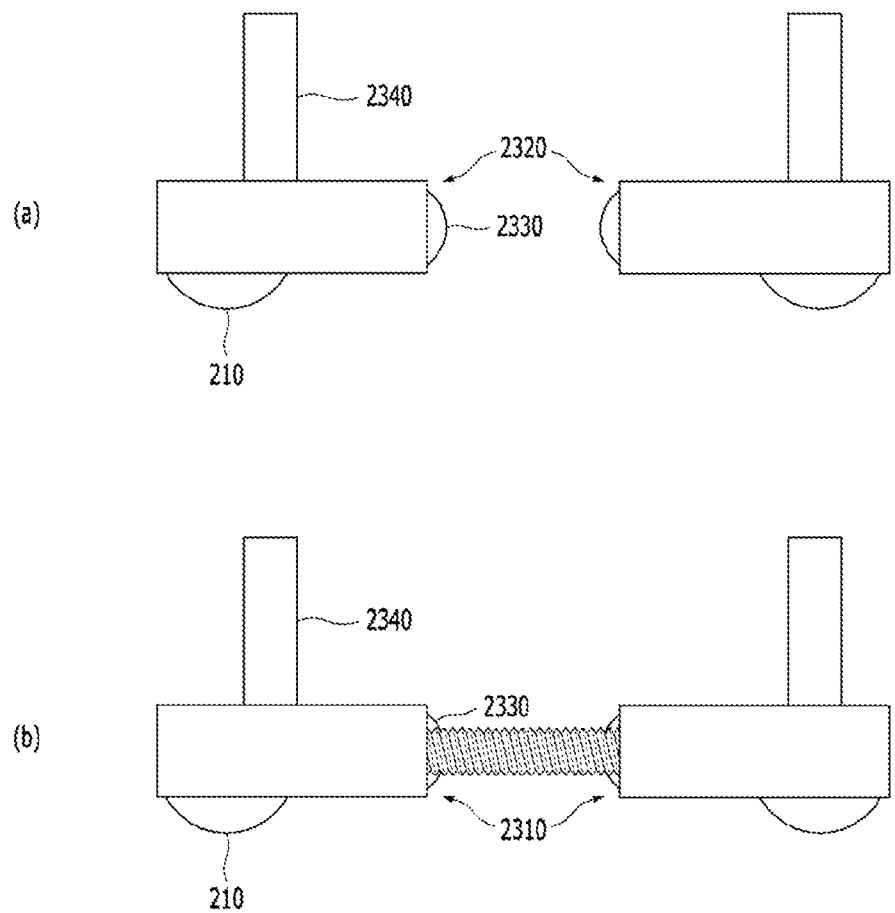

FIGS. 2A and 2B are schematic diagrams illustrating a structure of a second robot for providing a driving force for lifting a target object.

Referring to FIGS. 2A and 2B, the second robot 200 may include a lifting module 230 for lifting a preset lift area with respect to the target object. In addition, the lifting module 230 may be specifically provided in a structure including a pair of driving units 2310 and 2320, a roller unit 2330, and a support unit 2340.

Specifically, referring to FIG. 2A, a pair of driving units 2310 and 2320 may include a first driving unit 2310 and a second driving unit 2320 disposed at a distance from each other in a width direction (a direction from 12 o'clock to 6 o'clock in FIG. 2A) of the second robot 200. Further, referring to FIG. 2A, the roller unit 2330 of the lifting module 230 may be a pair of two roller units disposed at a distance from each other in a front-rear direction (a direction from 3 o'clock to 9 o'clock in FIG. 2A) of the second robot 200. In addition, the support unit 2340 of the lifting module 230 may be a pair of two support units disposed at a distance from each other in the front-rear direction of the second robot 200.

In this regard, (a) of FIG. 2B is a side view of the second driving unit 2320 forming an opening area to be described below in the pair of driving units 2310 and 2320, and (b) of FIG. 2B is a side view of the first driving unit 2310 having a closed structure in which the opening area is not formed in the pair of driving units 2310 and 2320.

According to an exemplary embodiment of the present disclosure, each of the pair of driving units 2310 and 2320 (in other words, each of the first driving unit 2310 and the second driving unit 2320) may include first body units 2311 and 2321 with female screws and second body parts 2312 and 2322 with male screws coupled to the female screws.

In addition, each of the pair of driving units 2310 and 2320 (in other words, each of the first driving unit 2310 and the second driving unit 2320) may include motor parts 2313 and 2323 for providing a driving force by which the first body units 2311 and 2321 and the second body parts 2312 and 2322 are relatively closed to or away from each other, respectively.

Meanwhile, referring to FIGS. 2A and 2B, the second driving unit 2320 of the pair of driving units of the lifting module 230 may form an opened area between the first body part 2321 and the second body part 2322 so as to perform the operation of lifting the lift area of the target object after the lift area of the target object (for example, a tire 1' area when the target object is the vehicle) enters an inner area based on the width direction of the lifting module 230.

In addition, according to an exemplary embodiment of the present disclosure, before the second robot 200 is disposed in the lift area of the target object, the second driving unit 2320 of the second robot 200 may move the male screw in one direction (e.g., a 3 o'clock direction in FIG. 2A) of the front-rear direction to form the above-described opened area. After the lift area of the target object enters the inner area based on the width direction of the lifting module 230, the second driving unit 2320 may move the male screw in the other direction (e.g., a 9 o'clock direction in FIG. 2A) of the front-rear direction so that when the end of the male screw reaches the end of the female screw, the male screw and the female screw are fastened to each other by the driving force provided by the motor part 2323 and the first body part 2321 and the second body part 2322 may move to be close to each other.

That is, the second driving unit 2320 may have a mechanism for relatively moving the male screw in both directions (see arrows in FIG. 2A) of the front-rear direction. According to the exemplary embodiment of the present invention, the driving force of moving the male screw in the front-rear direction may be provided by the motor part 2323, but is not limited thereto, and as another example, the motor part 2323 and the male screw may entirely move in both directions of the front-rear direction by a separate driving force supply means (not illustrated).

In other words, the second robot 200 may operate to lift the target object by supporting both ends of the front-rear direction of the outer surface of the lift area through the support unit 2340 after the lift area moves upward while the roller unit 2330 is in contact with the outer surface of the lift area so that the first body parts 2311 and 2321 and the second body parts 2312 and 2322 of the pair of driving units 2310 and 2320 move to be close to each other by driving the motor parts 2313 and 2323 after the second robot 200 is disposed at the lower side of the lift area of the target object by passing at least a part of the lift area of the target object through the opened area formed in the second driving unit 2320.

Figure 3A:
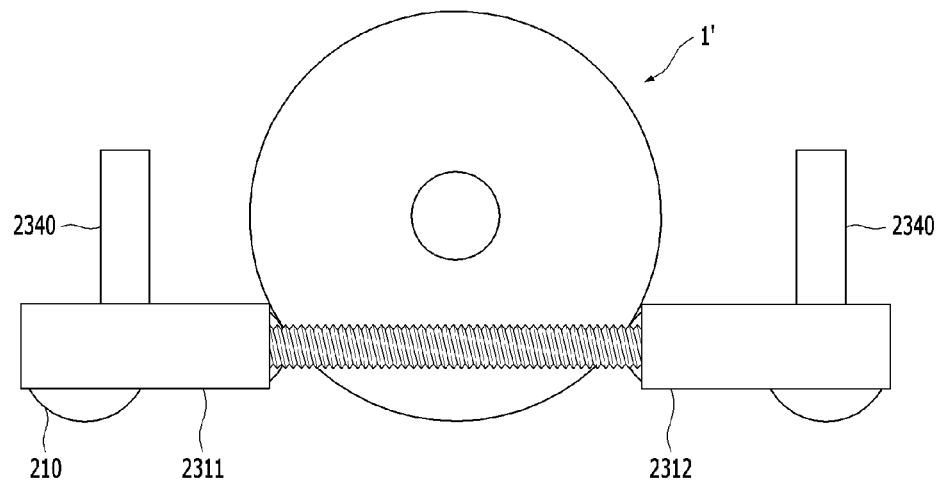
FIGS. 3A and 3B are schematic diagrams for describing a mechanism for lifting a target object using a second robot.
Figure 3B:
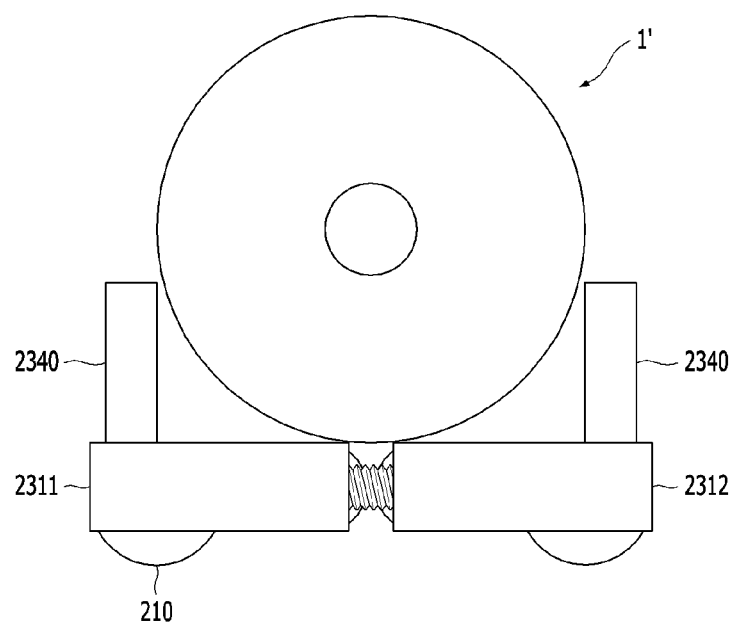

FIGS. 3A and 3B are schematic diagrams for describing a mechanism for lifting the target object using the second robot.

Referring to FIGS. 3A and 3B, in the lifting module 230 of the second robot 200, the motor parts 2313 and 2323 operate so that the roller unit 2330 approaches each other in the front-rear direction, and the motor parts 2313 and 2323 may provide a driving force for rotating the male screw. According to the exemplary embodiment of the present disclosure, a hydraulic method may also be applied to reduce the load of the motor parts 2313 and 2323.

In addition, the second robot 200 disclosed herein may be provided with a pair or more of motor parts 2313 and 2323 to distribute the load when lifting a relatively heavy object.

Meanwhile, the second robot 200 is not only provided to fix and support the lift area (e.g., the tire 1' area of the vehicle, etc.) through the thread of the screw-coupled structure, but also the male screw of the second driving unit 2320 disposed outside the lift area is provided to be movable along the front-rear direction (e.g., slidely move) by the motor part 2323 or together with the motor part 2323. While the second robot 200 moves to the reference location to be fixed to the lift area, the opened area is formed (Open), and when the second robot 200 is close to the lift area in the reference location, the male screw may move to be fastened to the female screw while the motor part 2323 moves relatively forward.

Figure 4:
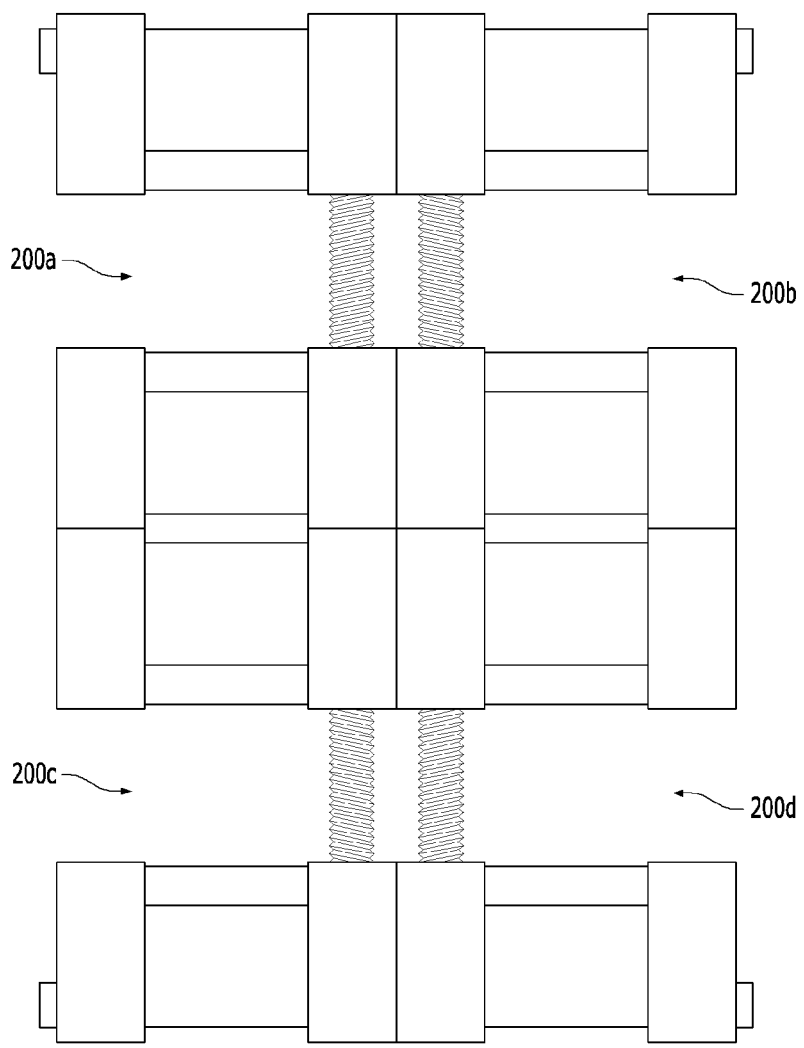
FIG. 4 is a schematic diagram illustrating a state in which a plurality of second robots are moved while being coupled to each other.

FIG. 4 is a schematic diagram illustrating a state in which a plurality of second robots is moved while being coupled to each other.

Referring to FIG. 4, in order to lift the target object (e.g., vehicle or building), while the second robot 200 receives a call from the integrated control server 300 to move to the reference location meaning a current location of the target object or a predetermined specific location and the like to perform an operation for lifting the target object from a predetermined initial location (e.g., charging station, etc), the plurality of allocated second robots 200 may move in a coupled form. According to an exemplary embodiment of the present disclosure, while the second robot moves to the reference locations as such, without assistance (e.g., providing path information, etc.) of the first robot 100, the sensor module 240 provided on the second robot 200 side may be used to recognize the surrounding environment or situation, generate a path by itself, and operate to move the second robots.

On the other hand, the plurality of second robots 200 moving to the reference location are illustratively disposed at a front left location FL, a front right location FR, a rear left location RL, AND a rear right location RR, respectively, to move in a coupled form. These placement locations or roles are not pre-designated for each of the second robots 200, but when the integrated control server 300 checks an individual charging state of each second robot 200 at a charging station, etc., and applies a placement location to each second robot 200 when selecting and calling the plurality of second robots 200 capable of transporting the target object based on a charging state and the like, the plurality of called second robots 200 may move to be coupled to each other based on each applied placement location.

However, the present invention is not limited thereto, and according to the exemplary embodiment of the present disclosure, the plurality of second robots 200 may individually move separately toward the reference location in consideration of the initial location, the charging state, and the like of each second robot 200. More specifically, as an example for better understanding, some second robots 200 among the plurality of second robots 200 selected (allocated) by the integrated control server 300 are in a state while performing the transporting objects other than the target object or in a state before returning to the charging station after completing the transporting operation of other objects. However, when the remaining second robots 200 are located in the charging station and are charging power, some second robots 200 may move to the reference location from the location where the pre-assigned transporting operation is completed or the current location of the second robot 200 and the remaining second robots 200 may move to the reference location from the charging station.

Figure 5A:
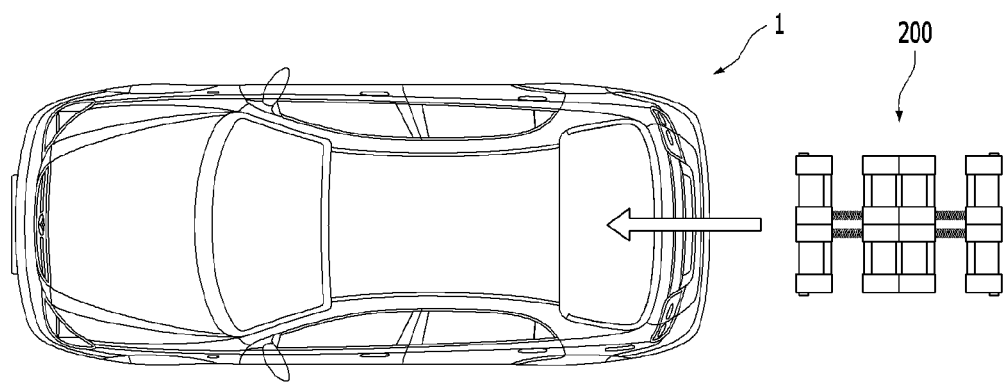
FIGS. 5A and 5B are schematic diagrams illustrating that a plurality of second robots separately move to lift areas individually allocated to a target object.
Figure 5B:
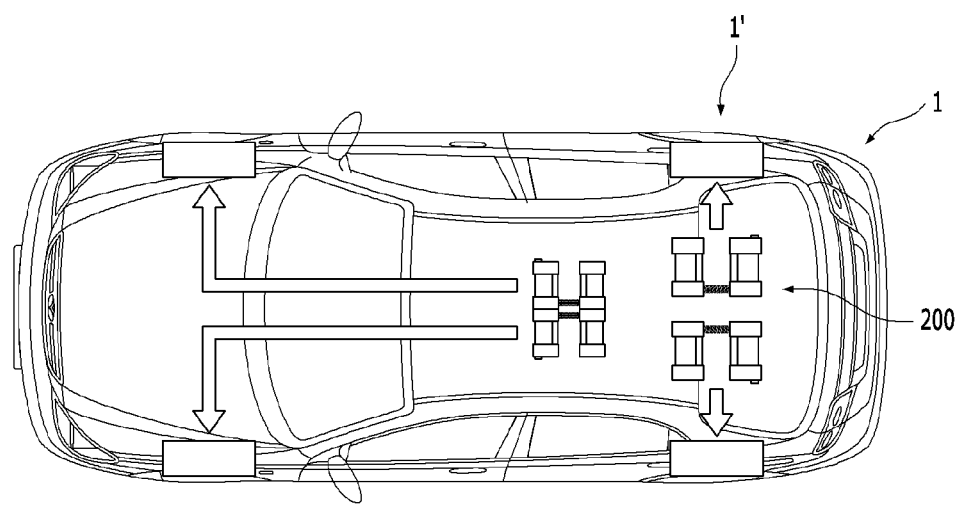

FIGS. 5A and 5B are schematic diagrams illustrating that a plurality of second robots separately move to lift areas individually allocated to the target object.

Referring to FIGS. 5A and 5B, after the plurality of second robots 200 arrive at the reference location of the target object in a coupled state, each second robot 200 moves separately, and among the outer surfaces of the target object, each second robot 200 is disposed with respect to the target object and operates to enter the lower portion of the target object through a surface of an appropriate direction to individually reach the lift area, the location where the target object is lifted. For example, each second robot 200 reaches the reference location and then may move individually through a surface (for example, a form in which each second robot 200 does not interfere with each other on the path when each second robot 200 moves to reach the lift area) suitable for reaching the individually allocated lift area among the front surface, the rear surface, the right surface, and the left surface of the vehicle as the target object.

In addition, according to the exemplary embodiment of the present disclosure, each second robot 200 may recognize the location (e.g., the location of a tire, etc.) of the allocated lift area using the sensor module 240 while entering the lower portion of the target object to reach the lift area to determine the driving direction and location and then drive to individually reach the lift area allocated to each second robot 200.

Figure 5C:
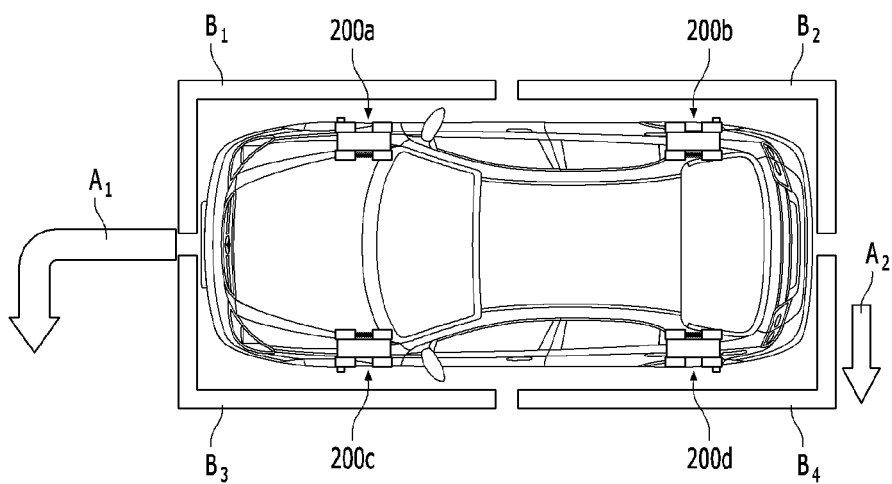
FIG. 5C is a schematic diagram illustrating visually displaying state information including movement directions of a first robot and a plurality of second robots.

FIG. 5C is a schematic diagram illustrating visually displaying state information including movement directions of the first robot and the plurality of second robots.

Referring to FIG. 5C, each of the first robot 100 and the second robot 200 may include a display means (not illustrated) capable of visually displaying (e.g., projecting onto the floor of the target space, etc.) state information including guide information about a movement direction of a target object or each robot, a robot status, and a safety distance set to prevent collision with the target object.

In this regard, $A_1$ and $A_2$ of FIG. 5C visualize state information projected on the floor surface of the target space by at least one of the first robot 100 and the second robot 200 to indicate the movement direction of the target object, and $B_1$ to $B_4$ of FIG. 5C visualize state information indicating a safety boundary that is shaped in response to a predetermined safety distance from the outer surface of the target object, which is set to prevent a collision with the target object.

According to the exemplary embodiment of the present disclosure, the shape of the state information displayed by each of the plurality of robots including the first robot 100 and the second robot 200 may be determined variably in consideration of the shape of the target object, the standard of the target object, the moving direction of the target object or the robot, the relative location of each robot, and the like. For example, the state information illustrated as $A_1$ in FIG. 5C is displayed by the first robot 100 driving in front of the target object, or may be displayed by the second robot (that is, robot corresponding to 200*a* and/or 200*c* of FIG. 5C) located relatively in front of the progress direction of the target object when the first robot 100 drives separately from the second robot 200.

Similarly, the state information illustrated as $A_2$ in FIG. 5C may be displayed by the first robot 100 driving behind the target object, but is not limited thereto. As another example, when the first robot 100 drives in front of the target object, the state information indicating the movement direction of the target object illustrated as $A_2$ in FIG. 5C may be selected as the second robot 200*d* disposed on the left rear side of the progress direction of the target object among the plurality of second robots 200. As yet another example, when the first robot 100 drives separately from the second robot 200, the state information illustrated as $A_2$ in FIG. 5C may be displayed by the second robot (that is, robot corresponding to 200*b* and/or 200*d* of FIG. 5C) disposed relatively behind the progress direction of the target object.

In addition, according to the exemplary embodiment of the present disclosure, among the plurality of second robots 200, the second robot 200 selected to display the state information displayed to indicate the movement direction of the target object may be selected in consideration of the movement direction of the target object. For example, as illustrated in $A_1$ of FIG. 5C, the state information indicating that the target object is going to proceed (rotate) in the left direction in the target space may be selected by the second robot 200*c* disposed on the front left side of the progress direction of the target object among the plurality of second robots 200.

Figure 6A:
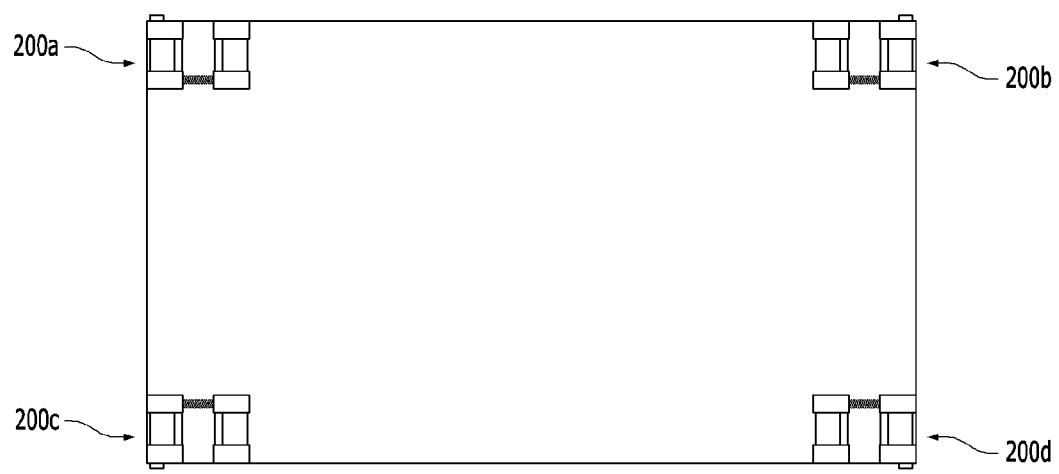
FIGS. 6A and 6B are schematic diagrams for describing an embodiment in which lift areas are set to a plurality of locations in consideration of standards such as size and weight of a target object.
Figure 6B:
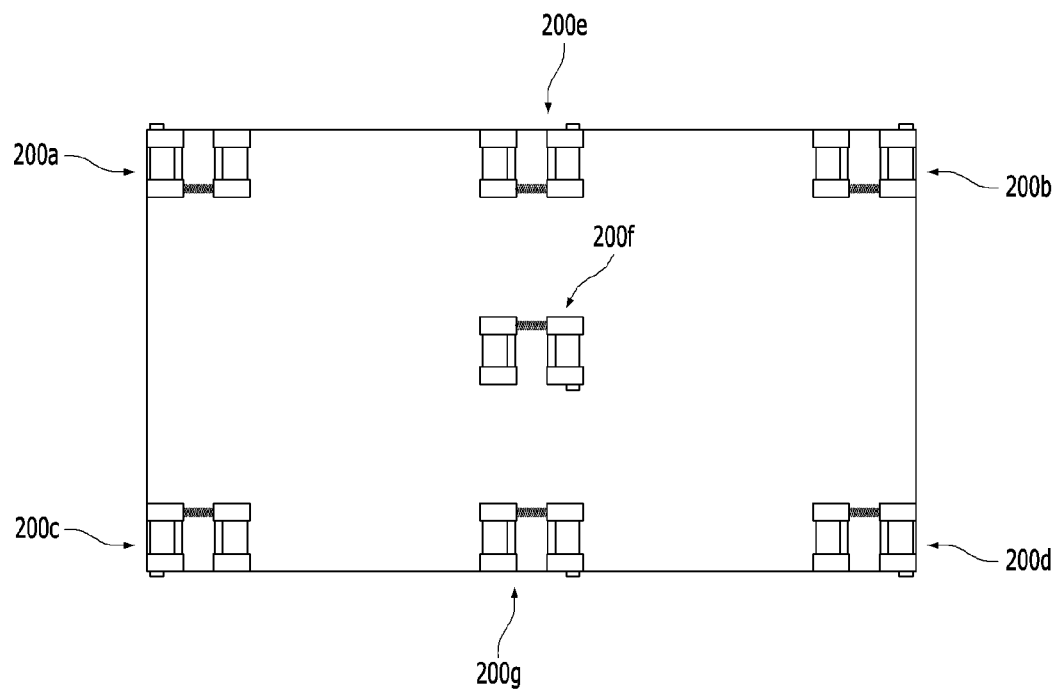

FIGS. 6A and 6B are schematic diagrams for describing an embodiment in which lift areas are set to a plurality of locations in consideration of standards such as size and weight of a target object.

Referring to FIGS. 6A and 6B, the number of second robots 200 allocated to move a target object may vary depending on the standard of the target object, and a lift area in charge of each second robot 200 may be determined by a different pattern in consideration of the number of allocated second robots 200, the shape of the target object, and the like. For example, when there are four second robots 200, each second robot 200 may be disposed at edges such as the upper left, upper right, lower left, and lower right ends based on a plan view of the target object viewed from the top (see 200a to 200d of FIG. 6A), but is not limited thereto.

As another example, when five or more second robots are disposed to transport a target object having a relatively large area, etc., based on a plan view, for the second robots 200 disposed in more than 4, the displacement locations of the second robots 200 may be relatively determined in consideration of the locations of edge regions such as upper left, upper right, lower left, and lower right ends. For example, referring to FIG. 6B, when seven second robots 200 are disposed entirely, the four second robots 200 are disposed at the edges of the upper left, upper right, lower left, and lower right ends (see 200a to 200d in FIG. 6B), respectively, and the remaining three second robots 200 may be disposed at the center (200e in FIG. 6B) of the upper left and upper right ends, the center (200g in FIG. 6B) of the lower left and lower right ends, and the center (200f in FIG. 6B) of the upper left, upper right, lower left and lower right ends, but it is not limited thereto.

Figure 7:
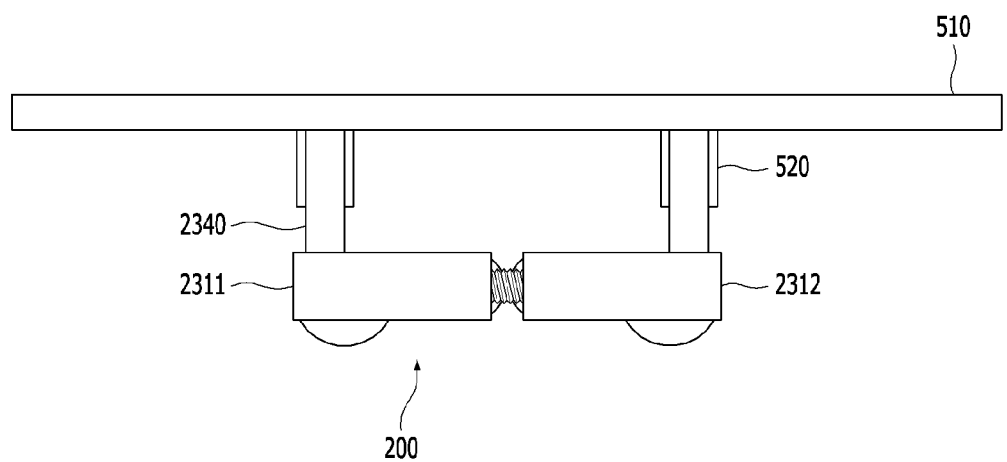
FIG. 7 is a schematic diagram illustrating a structure in which a flatbed member disposed to load an object thereon is coupled to a second robot.

FIG. 7 is a schematic diagram illustrating a structure in which a flat plate member disposed to load an object thereon is coupled to a second robot.

Referring to FIG. 7, even heavy or large objects that are difficult to be transported by conventional delivery robots may be transported by coupling a flatbed member 510 to the upper side of the second robot 200.

According to the exemplary embodiment of the present disclosure with reference to FIG. 7, the lower side of the flatbed member 510 is supported by the support unit 2340 in a form in which the upper end of the support unit 2340 of the lifting module 230 is inserted into a connection member 520 provided below the flatbed member 510, so that a predetermined object to be transported may be loaded on the upper portion of the flatbed member 510. However, the coupling between the second robot 200 and the flatbed member 510 is not limitedly applied only to the above-described examples, and may be achieved through various structures and methods.

In addition, according to the exemplary embodiment of the present disclosure, in order to transport the object to be transported, the plurality of second robots 200 may determine detailed locations of lift areas (for example, a predetermined area of the lower surface of the flatbed member 510, an area in which the connection member 520 is formed, etc.) for coupling with the flatbed member 510 in consideration of the size information and shape information of the flatbed member 510 coupled to the upper side of the second robot 200. As an example to help understanding, in a form in which the separation distance between the plurality of second robots 200 increases as the area of the flatbed member 510 used to transport the object to be transported is increased in consideration of the quantity, weight, standard, and the like of the object to be transported, the location of the lift area in which each of the plurality of second robots 200 is disposed may vary (in other words, the plurality of second robots 200 is dispersed and distributed in a relatively wide area). On the contrary, in the form in which the separation distance between the plurality of second robots 200 decreases as the area of the flatbed member 510 is relatively decreased, the location of the lift area in which each of the plurality of second robots 200 is disposed may vary (in other words, the plurality of second robots 200 are distributed at a high density in a relatively narrow area).

In addition, according to the exemplary embodiment of the present disclosure, after the second robot 200 is first disposed with respect to a connection portion (e.g., the connection member 520, etc.) corresponding to the flatbed member 510, the second robot 200 may be controlled so that the flatbed member 510 is placed on the upper side of the second robot 200 by using the connection portion so that the target object may be loaded on the flatbed member 510.

As another example, after the flatbed member 510 is first disposed on the bottom surface of the target space (in this case, the target object may be loaded in advance or not yet loaded on the flatbed member 510), the second robot 200 may also operate to lift the flatbed member 510 by moving from the location where the flatbed member 510 is disposed to the lower side of the flatbed member 510.

Figure 8B:
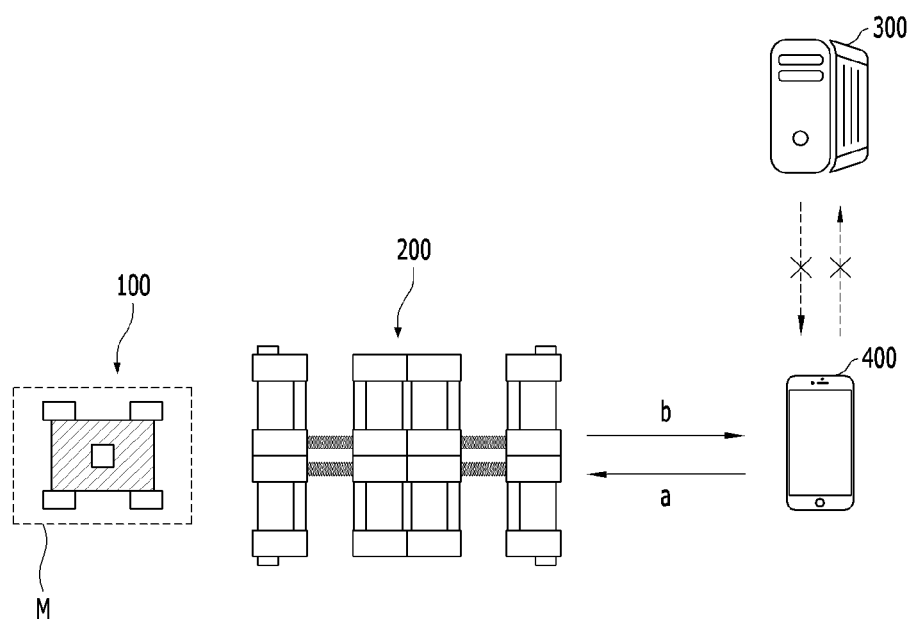

FIGS. 8A and 8B are schematic diagrams for describing a communication process of a plurality of distributed robots with respect to an integrated control server or a user terminal.

Specifically, referring to FIG. 8A, In a normal situation in which autonomous driving of the first robot 100 and the second robot 200 is performed, the user terminal 400 and the integrated control server 300 communicate with each other and may transmit a target object transport request ('a' in FIG. 8A), call the robot ('b' in FIG. 8A), receive real-time state information of the robot ('c' in FIG. 8A) or transmit a notification to the user ('d' in FIG. 8A).

On the other hand, referring to FIG. 8B, when a user needs to operate the distributed robot, not in the general autonomous driving situation of the distributed robot, direct communication between the user terminal 400 and the distributed robot may be made without the integrated control server 300 to minimize the latency. In this case, according to the exemplary embodiment of the present disclosure, the user terminal 400 does not communicate with all the allocated distributed robots, but may selectively communicate with a main robot ('M' of FIG. 8B) determined among a plurality of distributed robots (in other words, the first robot 100 and/or the plurality of second robots 200, etc.). In this regard, the main robot may be determined as the first robot 100 for a distributed robot group in which the first robot 100 and the plurality of second robots 200 drive together. As another example, when the plurality of second robots 200 self-drive in a coupled form without assistance of the first robot 100, any one of the second robots 200 may be determined as the main robot. More specifically, the second robot 200 determined as the main robot to communicate with the user terminal 400 among the plurality of second robots 200 may be determined as a second robot 200 with a relatively large amount of residual power in consideration of residual power information of the plurality of second robots 200 or may be arbitrarily determined by the integrated control server 300, but is not limited thereto.

Meanwhile, referring to FIG. 8A, in a charging station C, a plurality of first robots 100 and a plurality of second robots 200 may be disposed in individually partitioned areas to be charged. In particular, in the case of the second robot 200, the support unit 2340 for supporting the lift area of the target object is disposed in the charging station C in a folded state so that the volume of the loaded space may be relatively reduced.

Figure 9A:
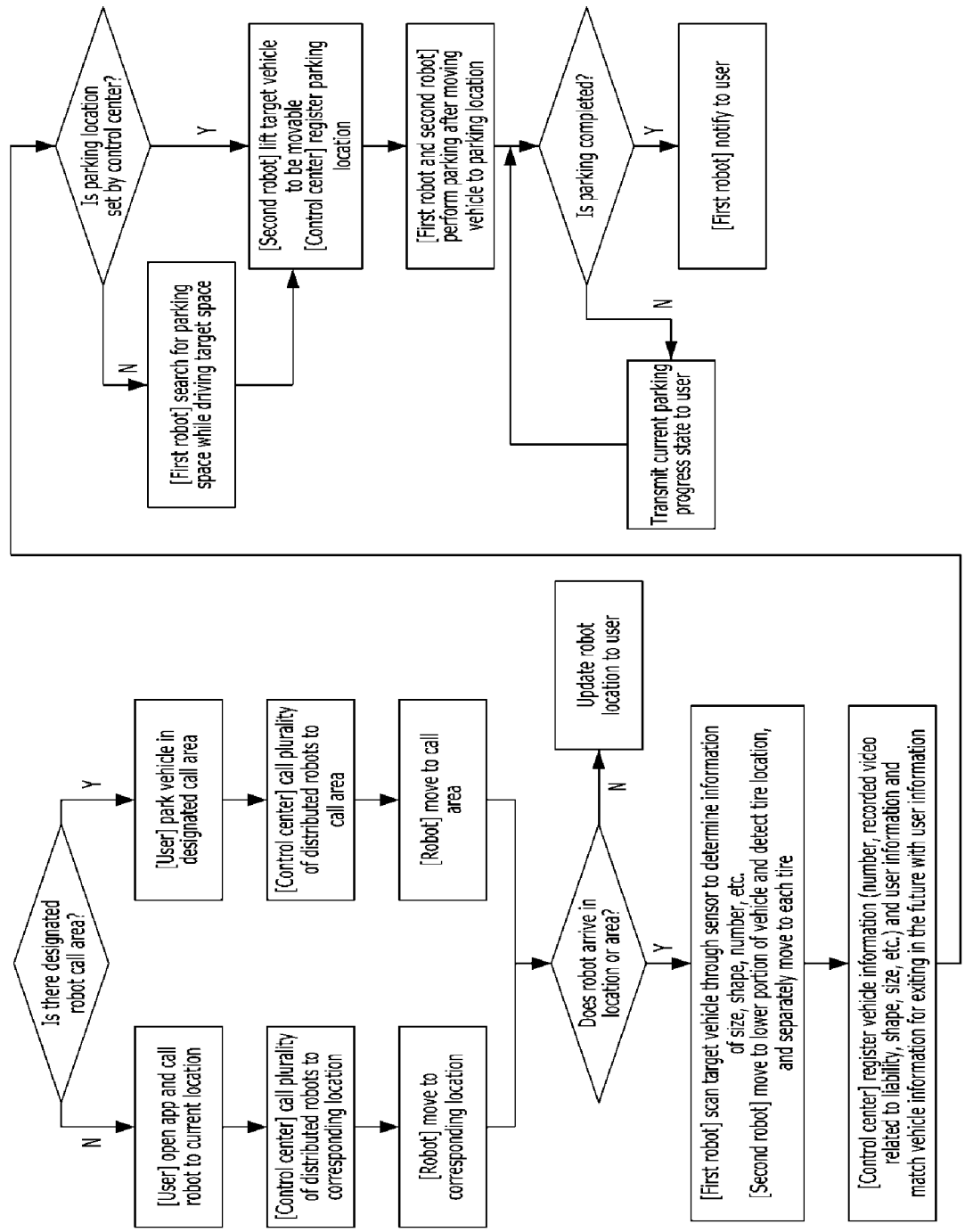
FIG. 9A is a diagram illustrating a parking process using a distributed robot-based object movement system according to an exemplary embodiment of the present disclosure.

FIG. 9A is a diagram illustrating a parking process using a distributed robot-based object movement system according to an exemplary embodiment of the present disclosure.

Referring to FIG. 9A, an object movement system 10 may perform an automatic parking service (automatic parking—to the parking spot).

Specifically, when there is a pre-designated place where the parking robot performs a vehicle lifting operation (loading operation) in the target space, the user may request loading of the vehicle at the designated place. Otherwise, when there is no designated place, the user may specify a location (current location or estimated arrival location, etc.) of the vehicle to be parked through a dedicated application (App) installed in the user terminal 400 to transmit the target object transport request (parking request).

In addition, an integrated control center (CC) 300 may determine the target object transport request from the user terminal 400, perform allocation to the first robot 100 and the second robot 200, and send allocated distributed robots to the corresponding reference location.

In addition, the integrated control server 300 may transmit a current robot state in real time while the first robot 100 and the second robot 200 move to the reference location (for example, allocation, current location, estimated time remaining until arrival at the reference location, etc.) to the user terminal 400.

In addition, when the first robot 100 and the second robot 200 arrive at the reference location, the first robot 100 may preemptively determine information about the vehicle (e.g., shape, size, number, image information, etc.) while scanning the corresponding vehicle to transmit the determined information to the integrated control server 300.

Then, while moving to the lower part of the vehicle, the second robot 200 may determine a location of the tire 1', which is the lift area, and move to the location (tire location) of each allocated lift area to lift the vehicle.

In addition, the integrated control server 300 may register information of the user (e.g., the information of the user terminal 400, the account information of the dedicated application App, etc.) and information of the recognized vehicle together and allocate a password and the like to match authentication information required for exiting the corresponding vehicle in the future.

Then, when the integrated control server 300 designates the parking space for the corresponding vehicle as the destination location, the integrated control server 300 or the first robot 100 may generate path information from the reference location to the destination location. On the other hand, when the integrated control server 300 does not designate a specific parking space in the target space as the destination location, the first robot 100 may drive the target space and search for an appropriate parking space as the destination location. Meanwhile, for searching for such a parking space (destination location), the first robot 100 may move independently of the second robot 200, and this parking space searching operation may be performed using the time while the second robot 200 performs the operation of lifting the target object.

In addition, according to the exemplary embodiment of the present disclosure, when the estimated vehicle exiting time information of the user is input through the user terminal 400, the integrated control server 300 or the first robot 100 may operate to determine the location of the parking space for the corresponding vehicle in detail within the target space in consideration of the input estimated vehicle exiting time information.

More specifically, to be exemplified to help the understanding, the integrated control server 300 or the first robot 100 may determine a location of a parking space in which the corresponding vehicle is to be parked as a location relatively close to a predetermined vehicle exiting location (e.g., an exit of the parking lot, etc.) of the target space as the estimated exiting time of the corresponding vehicle is input as a time point close to the current time point (in other words, as the time the vehicle is maintained to be parked in the parking space is estimated to be relatively short). On the contrary, the integrated control server 300 or the first robot 100 may determine a location of a parking space in which the corresponding vehicle is to be parked as a location (e.g., an inner region of a parking area, etc.) relatively spaced apart from a predetermined vehicle exiting location of the target space as the estimated exiting time of the corresponding vehicle is input as a time point far away from the current time point (in other words, as the time the vehicle is maintained to be parked in the parking space is estimated to be relatively long).

Accordingly, as the exiting time of the parked vehicle is closer, the vehicle is parked in a section outside the parking area where the vehicle exiting operation may be easily made in the future, and on the contrary, when the vehicle exiting time is too long, the vehicle is induced to be parked in a section inside the parking area. As a result, interference or confusion between the moving lines of each vehicle may be prevented when exiting the vehicle in the target space.

Then, the integrated control server 300 or the first robot 100 may generate path information for moving the target vehicle by setting the searched parking place as the destination location, and may initiate the movement when it is determined that the second robot 200 has sufficiently lifted the vehicle.

In addition, the integrated control server 300 may transmit a current situation to the user terminal 400 in real time while the target vehicle is moving, and may transmit a parking completion guide to the user terminal 400 when the target vehicle is parked at the destination location.

Figure 9B:
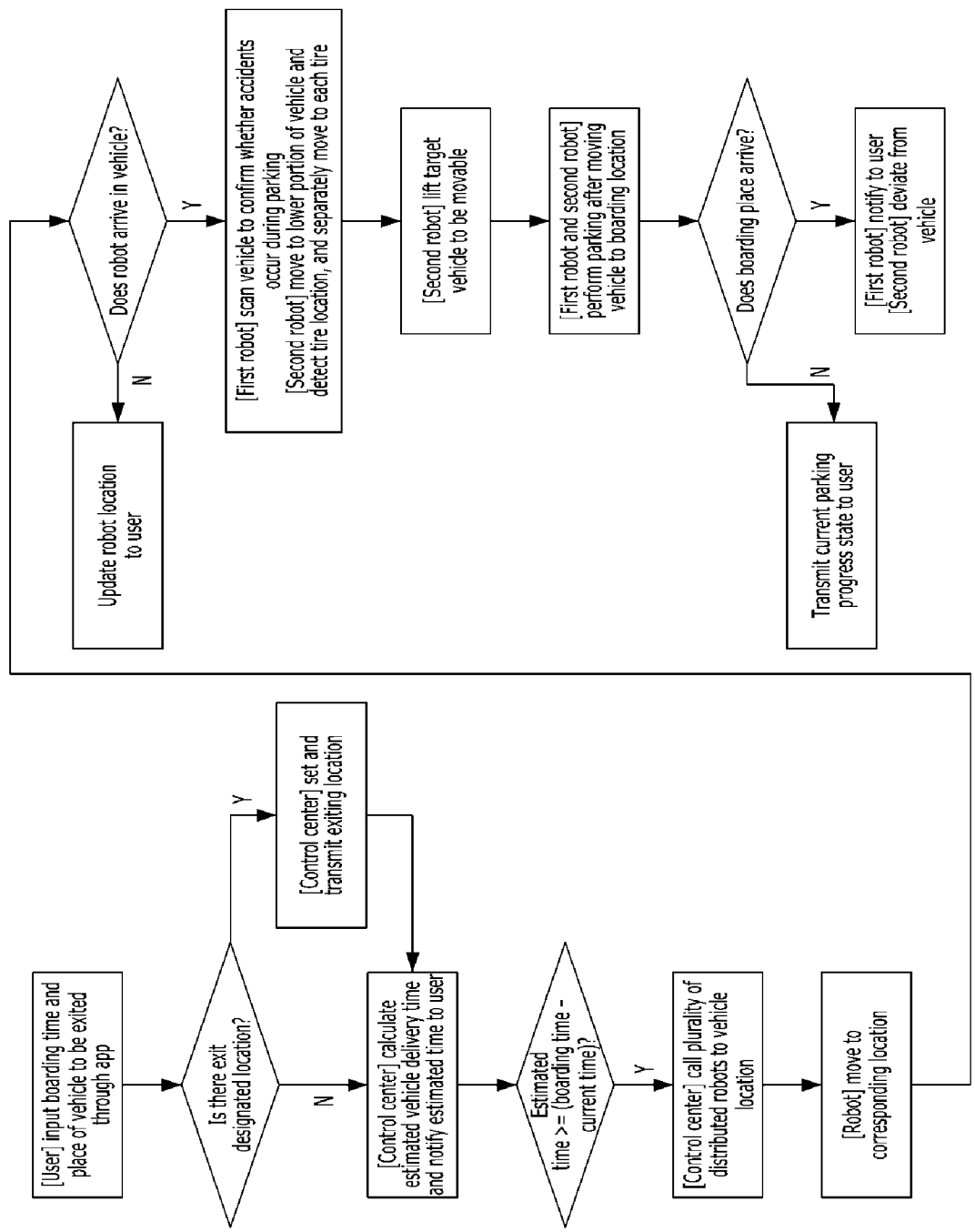
FIG. 9B is a diagram illustrating an exiting process using a distributed robot-based object movement system according to an exemplary embodiment of the present disclosure.

FIG. 9B is a diagram illustrating an exiting process using a distributed robot-based object movement system according to an exemplary embodiment of the present disclosure.

Referring to FIG. 9B, the object movement system 10 may perform an automatic exiting service (automatic parking—from the parking spot).

Specifically, when there is a pre-designated place in the parking lot where a distributed robot performs a vehicle exiting operation of transporting the parked vehicle, the user may request exiting of the vehicle from the designated location. On the contrary, when there is no designated place, the user may transmit a target object transport request (vehicle exiting request) by designating the location of the parked vehicle through a dedicated application App installed in the user terminal 400.

In addition, the user may set a desired time to exiting the vehicle through the dedicated application App installed in the user terminal 400.

In addition, an integrated control center (CC) 300 may match information of the user with information of the vehicle for which exiting the vehicle has been requested to determine whether the user who has transmitted the vehicle exiting request is an owner of the corresponding vehicle or an authenticated user. The integrated control server 300 may not allow transportation of the vehicle when it is determined that the user who has transmitted the vehicle exiting request is not a legitimate owner of the corresponding vehicle or is not an authenticated user as the matching result.

In addition, the integrated control center (CC) 300 may calculate a time estimated to transport the vehicle from the current vehicle location (parked location, reference location) to a location (destination location) where the user wants to board the vehicle. If the time taken to be transported is less than the remaining time based on the current time point, the integrated control center (CC) 300 may determine this time and performs the allocation to the first robot 100 and the second robot 200, and send the allocated distributed robots to the corresponding reference location.

In addition, when the first robot 100 and the second robot 200 arrive at the reference location, the first robot 100 may preemptively determine information about the vehicle (e.g., shape, size, number, image information, etc.) while scanning the corresponding vehicle to transmit the determined information to the integrated control server 300.

Then, while moving to the lower part of the vehicle, the second robot 200 may determine a location of the tire 1', which is the lift area, and move to the location (tire location) of each allocated lift area to lift the vehicle.

In addition, the integrated control server 300 may register information of the user (e.g., the information of the user terminal 400, the account information of the dedicated application App, etc.) and information of the recognized vehicle together and allocate a password and the like to match authentication information required for exiting the corresponding vehicle in the future.

Then, when the integrated control server 300 designates the parking space for the corresponding vehicle as the destination location, the integrated control server 300 or the first robot 100 may generate path information from the reference location to the destination location. On the other hand, when the integrated control server 300 does not designate a specific parking space in the target space as the destination location, the first robot 100 may drive in the target space and search for an appropriate parking space as the destination location. Meanwhile, for searching for such a parking space (destination location), the first robot 100 may move independently of the second robot 200, and this parking space searching operation may be performed using the time while the second robot 200 performs the operation of lifting the target object.

Then, the integrated control server 300 or the first robot 100 may generate path information for moving the target vehicle by setting the searched parking place as the destination location, and may initiate the movement when it is determined that the second robot 200 has sufficiently lifted the vehicle.

In addition, the integrated control server 300 may transmit a current situation to the user terminal 400 in real time while the target vehicle is moving, and when the target vehicle arrives at the destination location, the second robot 200 may lower the vehicle again and transmit an exiting completion guide to the user terminal 400.

Figure 9C:
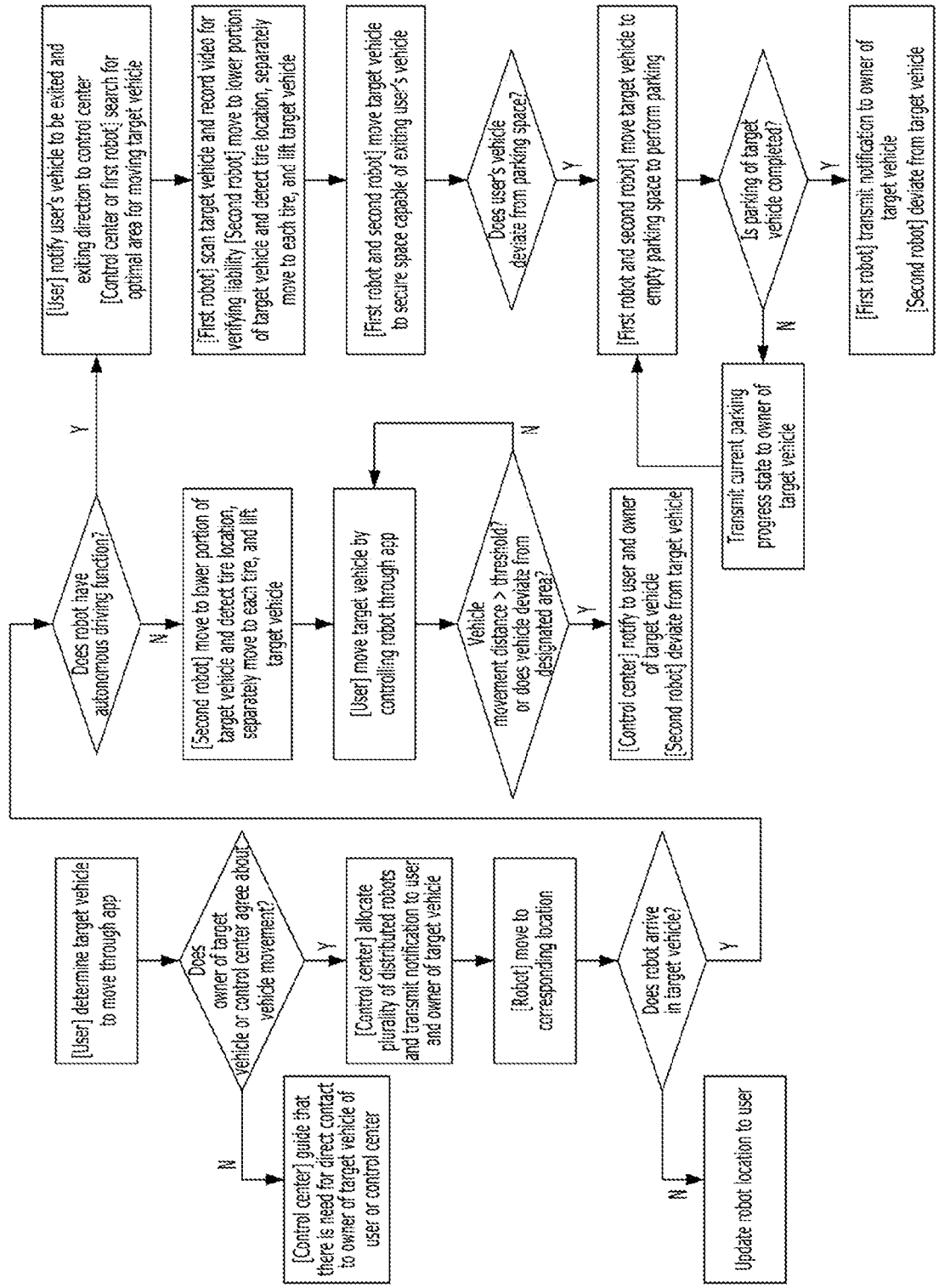
FIG. 9C is a diagram illustrating a double-parked vehicle moving process using a distributed robot-based object movement system according to an exemplary embodiment of the present disclosure.

FIG. 9C is a diagram illustrating a double-parked vehicle moving process using a distributed robot-based object movement system according to an exemplary embodiment of the present disclosure.

Referring to FIG. 9C, the object movement system 10 may perform a double-parked vehicle moving process (moving a double parked car).

Specifically, a target object transport request (double parking moving request) including the location and information of the vehicle to be moved may be transmitted through a dedicated application App installed in the user terminal 400.

Subsequently, the integrated control server 300 may request permission for vehicle movement to an owner of the corresponding vehicle (in other words, the double-parked vehicle) by using the previously identified vehicle information. At this time, if the owner of the corresponding vehicle does not allow the moving of the vehicle, the double-parked vehicle moving service is terminated, and a guide indicating that the service may not proceed may be transmitted to the user terminal 400 of the user who has transmitted the target object transport request.

If the owner of the corresponding vehicle permits the moving of the vehicle, the integrated control center (CC) 300 may perform the allocation to the first robot 100 and the second robot 200, and send the allocated distributed robots to the corresponding reference location.

In addition, the integrated control server 300 may transmit a current robot state in real time while the first robot 100 and the second robot 200 move to the reference location (for example, allocation, current location, estimated time remaining until arrival at the reference location, etc.) to the user terminal 400.

In addition, the integrated control server 300 may receive, from the user terminal 400 transmitting the double-parked moving request, information about the vehicle of the corresponding user (in other words, a vehicle to be exited after moving the double-parked vehicle) and an estimated moving path of the user's vehicle (in other words, whether to proceed in any one direction of straight ahead, left turn, or right turn after exiting the vehicle, etc.).

Meanwhile, according to the exemplary embodiment of the present disclosure, when it is determined that the location of the corresponding vehicle of the user received from the user terminal 400 is a location independent of the target vehicle for which the double-parked moving is requested, the integrated control server 300 may terminate the double-parked vehicle moving service, and transmit a notice indicating that the service may not proceed to the user terminal 400 of the user who has transmitted the target object transport request.

Then, the integrated control server 300 or the first robot 100 may determine where to move the target vehicle (i.e., the double-parked vehicle) according to the estimated movement path of the user's vehicle so as not to interfere with the movement path of the user's vehicle to set a movement path of the target vehicle.

In addition, when the first robot 100 and the second robot 200 arrive at the reference location, the first robot 100 may preemptively determine information about the vehicle (e.g., shape, size, number, image information, etc.) while scanning the corresponding vehicle to transmit the determined information to the integrated control server 300.

Then, while moving to the lower part of the vehicle, the second robot 200 may determine a location of the tire 1', which is the lift area, and move to the location (tire location) of each allocated lift area to lift the vehicle.

In addition, the integrated control server 300 may determine whether the exiting of the user's vehicle is completed based on the information sensed through the first robot 100 or the second robot 200, the location information on the user's vehicle, etc. When the exiting of the vehicle is completed, the target vehicle (i.e., the vehicle that was previously double-parked) may be moved to an empty space by the exiting of the user's vehicle using the first robot 100 and the second robot 200.

Then, the integrated control server 300 may transmit a current situation to the owner of the target vehicle in real time while the target vehicle is moving (e.g., transmitted to the user terminal of the owner), and may transmit a parking completion guide to the user terminal of the owner of the target vehicle when the parking of the target vehicle is completed.

On the other hand, according to the exemplary embodiment of the present disclosure, while the second robot 200 lifts the double parked target vehicle, the user of the user terminal 400 directly operates the second robot 200 (for example, inputting control commands for the moving direction, moving speed, etc. of the second robot 200 to the user terminal 400) and a service may be performed to partially move the double-parked target vehicle so that the user's vehicle may be exited. In this case, in order to prevent the theft of the vehicle when the target vehicle is moved (transported), when the vehicle moves at a preset distance or more or deviates from a predetermined area based on the location of the target vehicle, the movement may be stopped.

FIGS. 10A to 10D are schematic diagrams illustrating a relative driving location of the first robot determined in consideration of a progress direction of the target object, a location of an adjacent object, and the like.

Referring to FIGS. 10A to 10D, the first robot 100 drives together with the second robot 200 around the target object according to the path information, but may determine a relative driving location corresponding to the location of the target object according to the progress direction of the target object, and acquire second reference information in consideration of the determined driving location.

Figure 10A:
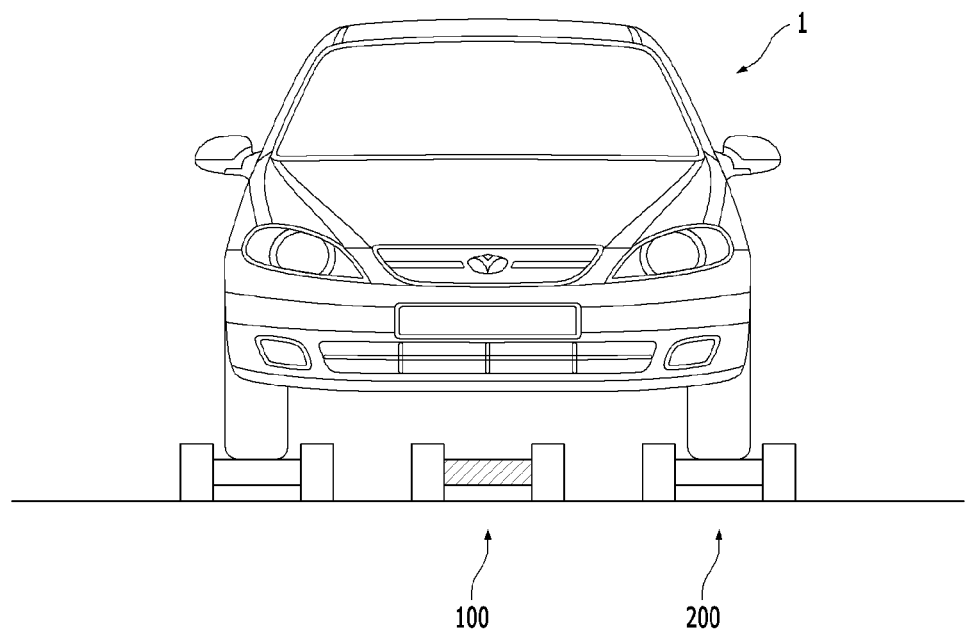
Figure 10B:
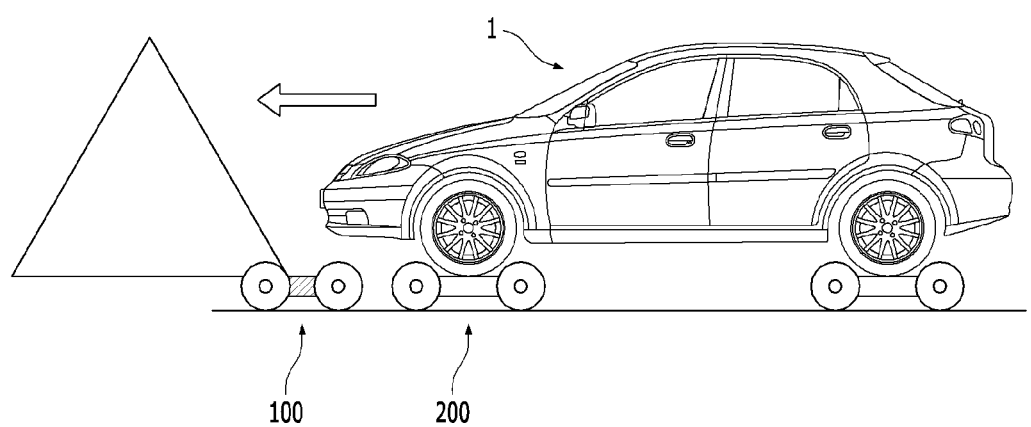
Figure 10C:
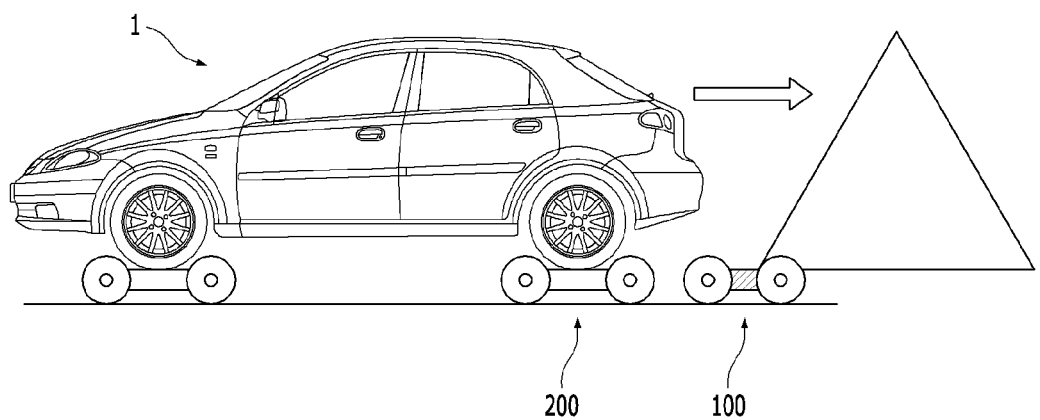

Specifically, referring to FIGS. 10B and 10C, when the vehicle moves forward, the first robot 100 may move to the front of the vehicle (e.g., in front of the front bumper) and when the vehicle moves backward, the first robot 100 may move to the rear of the vehicle (e.g., behind the rear bumper), and furthermore, may perform an object detection considering the progress direction of the vehicle. That is, referring to an object detection range of the first robot 100 illustrated as a triangle in FIGS. 10B and 10C, when the vehicle moves forward, the first robot 100 may detect an object toward the front of the vehicle and when the vehicle moves backward, the first robot 100 may detect an object toward the rear of the vehicle.

Figure 10D:
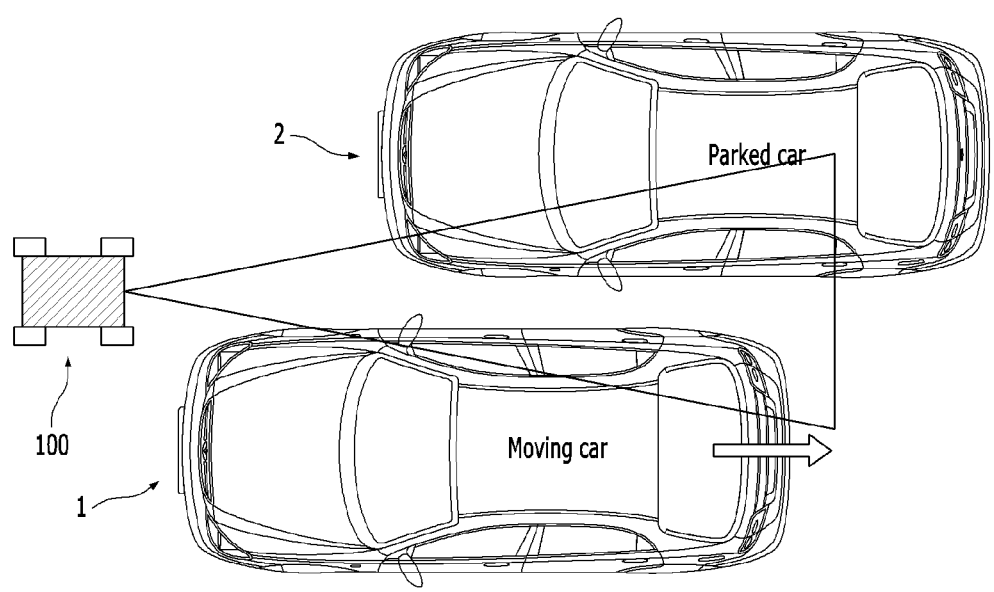

In addition, referring to FIG. 10D, when a pre-parked car 2 or a moving car 1 which is a target object adjacent to the wall surface and the like is parked, the first robot 100 may move to a location so that a side surface of the target vehicle 1 (more specifically, the pre-parked car 2 or the side surface adjacent to the wall surface) is included in a measuring range of the sensor in order to control the second robot 200 so that the target vehicle 1 may pass through a narrow space by the pre-parked car 2 or the wall surface without collision.

Figure 11:
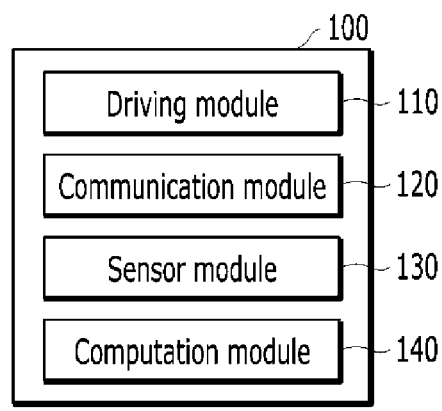
FIG. 11 is a schematic configuration diagram of a control robot of a distributed robot-based object movement system according to an exemplary embodiment of the present disclosure.

FIG. 11 is a schematic configuration diagram of a control robot of a distributed robot-based object movement system according to an exemplary embodiment of the present disclosure.

Referring to FIG. 11, the control robot 100 may include a driving module 110, a communication module 120, a sensor module 130, and a computation module 140.

The driving module 110 may be provided to move a target space including a reference location where the target object is located and a predetermined destination location for moving the target object.

The driving module 110 may have a wheel structure for moving the control robot 100. For example, wheels provided in the driving module 110 may be provided in types such as wheels for forward/backward movement moving in the front-rear direction, an omnidirectional wheel (Omni Wheel) for omnidirectional movement, and the like. In addition, the driving module 110 may include a motor (not illustrated) for providing a driving force to the wheels.

The communication module 120 may acquire path information from a reference location to a destination location. For example, the communication module 120 may receive the path information from the reference location generated by the integrated control server 300 to the destination location from the integrated control server 300.

In addition, the communication module 120 may transmit a driving control command based on the acquired path information to the lift robot 200 for lifting the target object.

The sensor module 130 may acquire first reference information associated with the target object and second reference information on the target space including the reference location and the destination location from the target space.

Specifically, according to the exemplary embodiment of the present disclosure, the sensor module 130 of the control robot 100 and the sensor module 240 of the lift robot 200 may include a camera, a radar sensor, a lidar sensor, an ultrasonic sensor, etc. for recognizing the environment around the robot, but is not limited thereto, and various sensing means capable of acquiring reference information (second reference information) associated with the driving environment may be widely applied.

The computation module 140 may generate path information based on the first reference information and the second reference information. In other words, according to the exemplary embodiment of the present disclosure, the control robot 100 may receive the path information from the integrated control server 300 to operate to control the driving of the plurality of distributed robots based on the path information or operate to generate path information from the reference location to the destination location by itself based on the reference information (sensor data, etc.) acquired from each of the plurality of distributed robots.

Meanwhile, according to the exemplary embodiment of the present disclosure, the sensor module 130 for recognizing the surrounding environment of the control robot 100, the computation module 140 for computation processing based on the above-described various reference information, other distributed robots (e.g., a plurality of lift robots 200 driving together in a group, etc.), the integrated control server 300, and the communication module 120 for communication with the user terminal 400 are provided in an integrated form such as a package form, a chip, a single element, etc. to be mounted on the control robot 100, but it is not limited thereto.

In addition, according to the exemplary embodiment of the present disclosure, the control robot 100 may include a power supply module (not illustrated) that drives a motor (e.g., a motor for driving the wheels of the driving module 110) and provides power for operating the communication module 120, the sensor module 130, the computation module 140, and the like. For example, the power supply module (not illustrated) may include a battery and a connection member for charging the battery from an external power supply.

Figure 12:
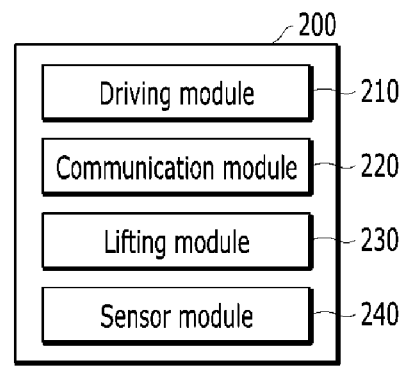
FIG. 12 is a schematic configuration diagram of a lift robot of a distributed robot-based object movement system according to an exemplary embodiment of the present disclosure.

FIG. 12 is a schematic configuration diagram of a lift robot of a distributed robot-based object movement system according to an exemplary embodiment of the present disclosure.

Referring to FIG. 12, the lift robot 200 may include a driving module 210, a communication module 220, a lifting module 230, and a sensor module 240.

The driving module 210 may be provided to move a target space including a reference location where the target object is located and a predetermined destination location for moving the target object. According to the exemplary embodiment of the present disclosure, the driving module 210 of the lift robot 200 may be a module driving in a manner corresponding to the driving module 110 of the control robot 100.

In addition, the driving module 210 may drive along the path information while the lifting module 230 lifts the target object.

The communication module 220 may receive path information from a reference location to a destination location. According to the exemplary embodiment of the present disclosure, the communication module 220 may receive the path information from the integrated control server 300 or receive the path information from the control robot 100.

More specifically, the communication module 220 of the lift robot 200 receives the path information from the integrated control server 300 when moving to the reference location where the target object is located from a predetermined initial location (e.g., a location of the charging station, etc.) of the lift robot 200 or drives based on the path information self-generated based on the acquired reference information (sensor data) acquired by the sensor module 240. When moving the target object to be transported to the destination location after lifting the target object at the reference location, the communication module 220 may receive the path information from the control robot 100 to operate to drive based on the received path information.

The lifting module 230 may provide a driving force for lifting the target object from the reference location.

The sensor module 240 may acquire first reference information associated with the target object and second reference information on the target space including the reference location and the destination location from the target space.

In addition, the sensor module 240 may detect locations of the lift areas of the target object when the second robot 200 moves to the reference location or after the second robot 200 reaches the reference location.

In addition, the sensor module 240 may detect the lifting level of the lift area while the second robot 200 is used to lift the target object (in other words, when providing a driving force for lifting the target object).

In addition, like the aforementioned control robot 100, the sensor module 240 for recognizing the surrounding environment of the lift robot 200, the computation module (not illustrated) for computation processing based on the reference information acquired from the sensor module 240, other distributed robots (e.g., the lift robot 200, the control robot 100, etc. driving together in a group), the integrated control server 300, and the communication module 220 for communication with the user terminal 400 are provided in an integrated form such as a package form, a chip, a single element, etc. to be mounted on the lift robot 200, but it is not limited thereto.

In addition, according to the exemplary embodiment of the present disclosure, the lift robot 200 may include a power supply module (not illustrated) that drives a motor (e.g., a motor for driving the wheels of the driving module 210, a motor provided in the lifting module 230, etc.) and provides power for operating the communication module 220, the sensor module 240, the computation module (not illustrated), and the like. For example, the power supply module (not illustrated) may include a battery and a connection member for charging the battery from an external power supply.

Hereinafter, an operational flow of the present disclosure will be briefly described based on the contents described above in detail.

Figure 13:
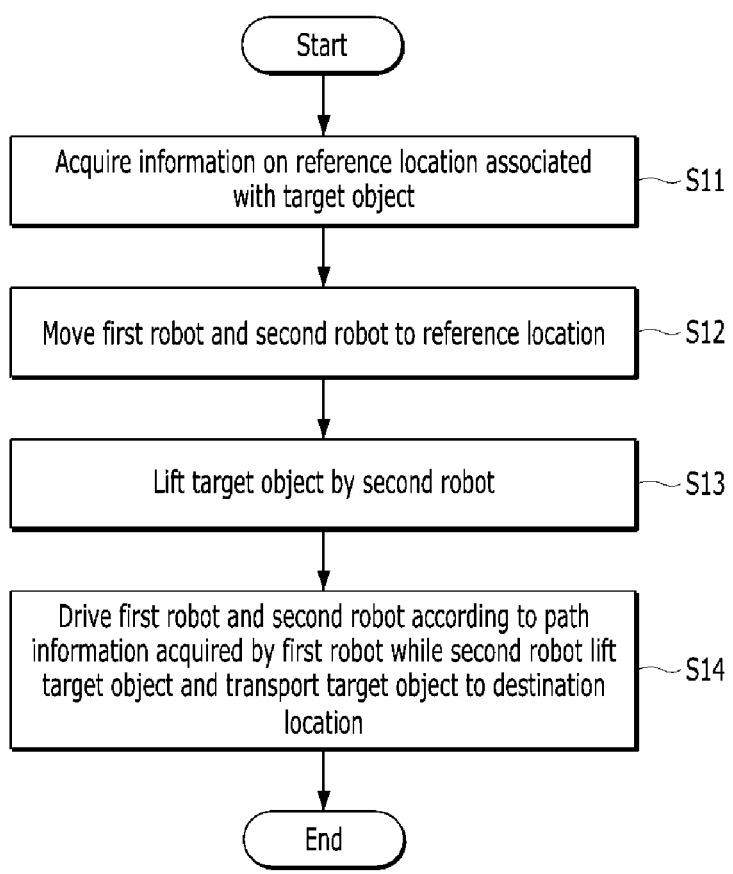
FIG. 13 is an operational flowchart for an object movement method by a distributed robot-based object movement system according to an exemplary embodiment of the present disclosure.

FIG. 13 is an operational flowchart for an object movement method by a distributed robot-based object movement system according to an exemplary embodiment of the present disclosure.

According to an exemplary embodiment of the present disclosure illustrated in FIG. 13, an object movement method by a distributed robot-based object movement system may be performed by the object movement system 10 described above. Therefore, even if omitted below, the contents described with respect to the object movement system 10 may be equally applied even in the description for the object movement method by the distributed robot-based object movement system according to the exemplary embodiment of the present disclosure.

Referring to FIG. 13, in step S11, the object movement system 10 may (a) acquire information on a reference location associated with a target object.

Next, in step S12, the object movement system 10 may (b) move a first robot 100 that acquires path information for moving the target object from the reference location to a predetermined destination location and a second robot 200 that provides a driving force for lifting the target object to the reference location.

Next, in step S13, the object movement system 10 may (c) lift the target object by the second robot 200.

Next, in step S14, the object movement system 10 may (d) drive the first robot 100 and the second robot 200 according to the path information while the second robot 200 lifts the target object and transmit the target object to the destination location.

In the above description, steps S11 to S14 may be further divided into additional steps or may be combined with fewer steps according to an exemplary embodiment of the present disclosure.

In addition, some steps may also be omitted if necessary, or the order between the steps may also be changed.

Figure 14:
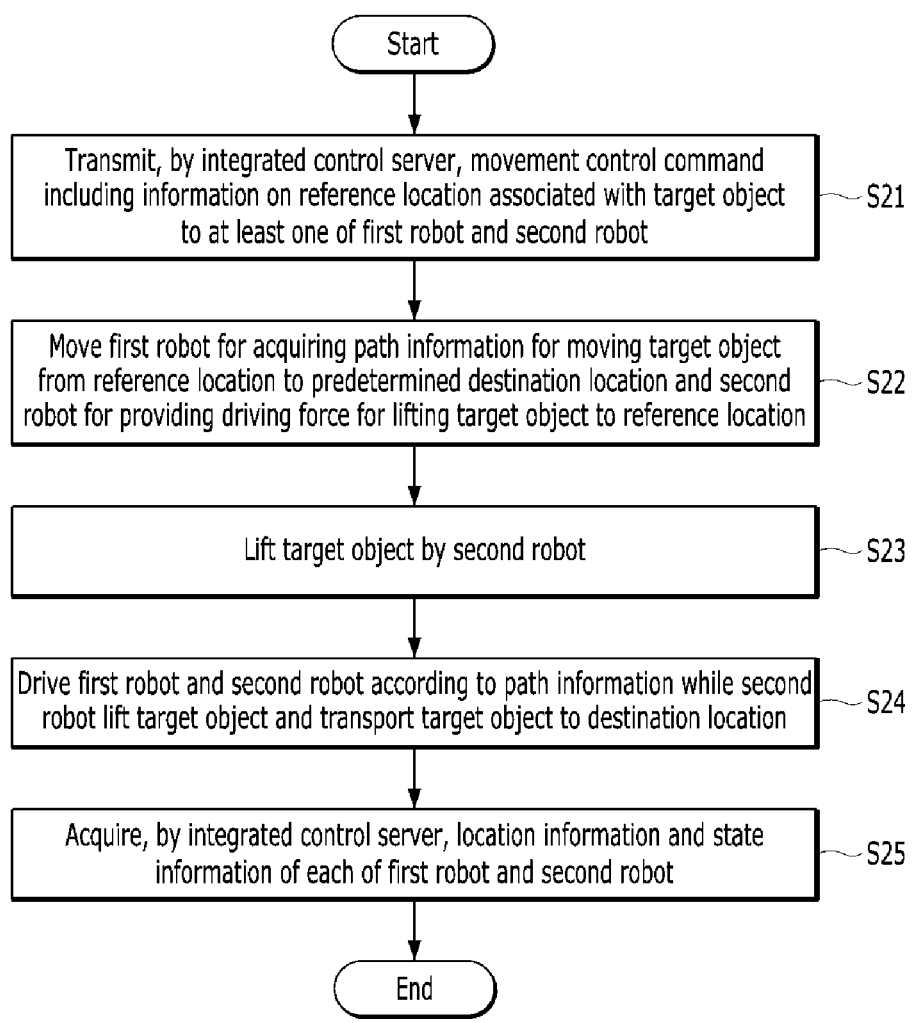
FIG. 14 is an operational flowchart for an object movement method by a distributed robot-based object movement system according to another exemplary embodiment of the present disclosure.

FIG. 14 is an operational flowchart for an object movement method by a distributed robot-based object movement system according to another exemplary embodiment of the present disclosure.

According to another exemplary embodiment of the present disclosure illustrated in FIG. 14, an object movement method by a distributed robot-based object movement system may be performed by the object movement system 10 described above. Accordingly, even if omitted below, the description of the object movement system 10 may be equally applied to the description of FIG. 14.

Referring to FIG. 14, in step S21, the integrated control server 300 may transmit a movement control command including information on a reference location associated with a target object to at least one of the first robot 100 and the second robot 200.

Next, in step S22, the first robot 100 and the second robot 200 may move to the reference location.

Next, in step S23, the second robot 200 may lift the target object.

Next, in step S24, the first robot 100 and the second robot 200 may drive according to the path information while the second robot lifts the target object, and transport the target object to the destination location.

Next, in step S25, the integrated control server 300 may acquire location information and state information of each of the first robot 100 and the second robot 200.

In the above description, steps S21 to S25 may be further divided into additional steps or may be combined with fewer steps according to an embodiment of the present invention. In addition, some steps may also be omitted if necessary, or the order between the steps may also be changed.

The object movement method by the distributed robot-based object movement system according to an exemplary embodiment of the present disclosure may be implemented in a program instruction form which may be performed by various computer means to be recorded on a computer readable medium. The computer readable medium may include program instructions, data files, data structures, and the like alone or in combination. The program instructions recorded in the medium may be specially designed and configured for the present invention, or may be publicly known to and used by those skilled in the computer software art. Examples of the computer readable medium include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high language codes executable by a computer using an interpreter and the like, as well as machine language codes created by a compiler. The hardware device may be configured to be operated with one or more software modules in order to perform the operation of the present invention and vice versa.

Further, the object movement method by the distributed robot-based object movement system described above may be implemented even in a form of computer programs or applications to be executed by a computer, which are stored in the recording medium.

The aforementioned description of the present invention is to be exemplified, and it can be understood by those skilled in the art that the technical spirit or required features of the present invention can be easily modified in other detailed forms without changing. Therefore, it should be appreciated that the embodiments described above are illustrative in all aspects and are not restricted. For example, respective components described as single types can be distributed and implemented, and similarly, components described to be distributed can also be implemented in a coupled form.

The scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. A distributed robot-based object movement system comprising:
   a first robot that moves to a reference location where a target object is located, and acquires path information for moving the target object from the reference location to a predetermined destination location; and
   a second robot that moves to the reference location, provides a driving force for lifting the target object, and drives according to the path information while lifting the target object,
   wherein the first robot generates the path information or receives the path information from an integrated control server,
   wherein the first robot generates the path information based on first reference information associated with the target object and second reference information for a target space including the reference location and the destination location, and
   wherein the first reference information includes shape information and size information of the target object.

2. The distributed robot-based object movement system of claim 1, wherein the second reference information includes obstacle information located in the target space, and
   the first robot detects a risk of collision of the target object based on the first reference information and the second reference information, and generates the path information in consideration of the detected risk of collision.

3. The distributed robot-based object movement system of claim 2, wherein the first robot drives around the target object together with the second robot according to the path information, determines a relative driving location corresponding to the location of the target object according to a progress direction of the target object, and acquires the second reference information in consideration of the determined driving location.

4. The distributed robot-based object movement system of claim 1, wherein the second robot is disposed to lift a preset lift area with respect to the target object, and
   the second robot detects the location of the lift area when moving to the reference location, and detects the lifting level of the lift area when the driving force is provided.

5. The distributed robot-based object movement system of claim 4, wherein a plurality of second robots is provided,
   wherein each of the plurality of second robots is allocated to a different lift area with respect to the target object.

6. The distributed robot-based object movement system of claim 5, wherein the plurality of second robots moves in a coupled state to each other to reach the reference location, and then separately moves so that each of the plurality of second robots is located in the lift area allocated to each of the plurality of second robots.

7. The distributed robot-based object movement system of claim 1, wherein the first robot and the second robot drive while exchanging location information and sensing information for a driving environment with each other.

8. The distributed robot-based object movement system of claim 1, further comprising:
   an integrated control server that receives a target object transport request of a user, transmits a movement control command to the reference location to at least one of the first robot and the second robot in response to the target object transport request, and receives location information and state information of each of the first robot and the second robot from at least one of the first robot and the second robot.

9. The distributed robot-based object movement system of claim 8, wherein the integrated control server selects the first robot and the second robot to move to the reference location in response to the target object transport request from among the plurality of robots.

10. The distributed robot-based object movement system of claim 9, wherein the integrated control server selects the first robot and the second robot based on charging state information of each of the plurality of robots.

11. The distributed robot-based object movement system of claim 8, wherein the integrated control server provides, to a user terminal of the user, the location information, the state information, and estimated arrival time information to the reference location or the destination location of at least one of the first robot and the second robot.

12. The distributed robot-based object movement system of claim 8, wherein the integrated control server receives the target object transport request including user information of the user and object identification information of the target object, and generates authentication information for recovery of the target object based on the user information and the object identification information.

13. An object movement method using a distributed robot-based object movement system comprising steps of:
   (a) acquiring information on a reference location associated with a target object;
   (b) moving a first robot that acquires path information for moving the target object from the reference location to a predetermined destination location and a second robot that provides a driving force for lifting the target object to the reference location;

(c) lifting the target object by the second robot; and (d) transporting the target object to the destination location while the first robot and the second robot drive according to the path information while the second robot lifts the target object, wherein the first robot generates the path information or receives the path information from an integrated control server, wherein the first robot generates the path information based on first reference information associated with the target object and second reference information for a target space including the reference location and the destination location, and wherein the first reference information includes shape information and size information of the target object.

14. An object movement method using a distributed robot-based object movement system comprising steps of:

(a) transmitting, by an integrated control server, a movement control command including information on a reference location associated with a target object to at least one of a first robot and a second robot;

(b) moving the first robot that acquires path information for moving the target object from the reference location to a predetermined destination location and the second robot that provides a driving force for lifting the target object to the reference location;

(c) lifting the target object by the second robot;

(d) transporting the target object to the destination location while the first robot and the second robot drive according to the path information while the second robot lifts the target object; and (e) acquiring, by the integrated control server, location information and state information of each of the first robot and the second robot, wherein the first robot generates the path information or receives the path information from an integrated control server, wherein the first robot generates the path information based on first reference information associated with the target object and second reference information for a target space including the reference location and the destination location, and wherein the first reference information includes shape information and size information of the target object.

15. A lift robot of a distributed robot-based object movement system comprising:

a driving module for moving a target space including a reference location where a target object is located and a predetermined destination location for moving to the target object;

a communication module for receiving path information from the reference location to the destination location and receiving a driving control command based on the path information from a control robot; and a lifting module for providing a driving force for lifting the target object in the reference location, wherein the driving module drives according to path information while the lifting module lifts the target object, and wherein the lifting module comprises a pair of driving units which include a first body part formed with a female screw and a second body part formed with a male screw coupled to the female screw, respectively, and a motor part for providing a driving force so that the first body part and the second body part are relatively close to or far away from each other;

a roller unit interposed between the pair of driving units so as to support the lower portion of the target object and lift the target object while the male screw and the female screw are fastened to each other by moving the first body part and the second body part of each of the pair of driving units in a direction close to each other; and a support unit for supporting at least a part of an outer surface of the target object while the target object moves upward to prevent separation of the target object.

16. The lift robot of claim 15, wherein the lifting module lifts a preset lift area with respect to the target object, and further comprising a sensor module for detecting a location of the lift area when moving to the reference location and detecting a lifting level of the lift area when the driving force is provided.

* * * * *